United States Patent
DiRisio

[11] Patent Number: 6,167,197
[45] Date of Patent: Dec. 26, 2000

[54] CAMERA WITH FRAME SHIFT PREVENTION DURING EXPOSURE

[75] Inventor: Anthony DiRisio, Rochester, N.Y.

[73] Assignee: Eastman Kodak Company, Rochester, N.Y.

[21] Appl. No.: 09/283,420

[22] Filed: Apr. 1, 1999

[51] Int. Cl.[7] .................................................. G03B 17/02
[52] U.S. Cl. .............................. 396/6; 396/399; 396/440
[58] Field of Search .................................. 396/395, 397, 396/399, 400, 440, 6

[56] References Cited

U.S. PATENT DOCUMENTS

| | | |
|---|---|---|
| 3,696,723 | 10/1972 | Ernisse . |
| 3,768,389 | 10/1973 | Ettischer et al. ........................ 396/399 |
| 3,999,199 | 12/1976 | Beach . |
| 5,708,888 | 1/1998 | Nishizawa . |

Primary Examiner—David M. Gray
Attorney, Agent, or Firm—Roger A. Fields

[57] ABSTRACT

A camera comprising a main body part with spaced film supply and film take-up chambers and an exposure opening located between the film supply and take-up chambers and configured for exposing an unexposed film frame, a metering pawl for engaging a film perforation during exposure of the film frame at the exposure opening, and a film winding take-up for moving an exposed frame in a film take-up direction from the exposure opening to the film take-up chamber, is characterized in that the metering pawl is supported to engage a film perforation between the exposure opening and the film supply chamber during exposure of a film frame at the exposure opening, and a tensioning spring urges the metering pawl substantially opposite to the film take-up direction in order to tension a film frame at the exposure opening. Since the film length between the metering pawl and the film winding take-up is longitudinally tensioned, the film frame is similarly tensioned at the exposure opening. Thus, the film tensioning positively acts to prevent frame shift during exposure of the film frame.

5 Claims, 22 Drawing Sheets

CAMERA WITH FRAME SHIFT PREVENTION DURING EXPOSURE

CROSS-REFERENCE TO RELATED APPLICATION

Reference is made to commonly assigned, application Ser No. 09/283,719, entitled METERING/RE-COCKING MEMBER FOR ENGAGING FILM DURING EXPOSURE AND FOR RE-COCKING SHUTTER ACTUATOR, SEPARATES FROM SHUTTER ACTUATOR WHEN RE-COCKED and filed Apr. 1, 1999 in the name of Anthony DiRisio, now U.S. Pat. No. 6,092,936.

FIELD OF THE INVENTION

The invention relates generally to the field of photography, and in particular to cameras. More specifically, the invention relates to a camera with a film metering pawl that engages a filmstrip at a film perforation to prevent frame shift during exposure of a film frame.

BACKGROUND OF THE INVENTION

It is generally known for a camera to have a main body part with spaced film supply and film take-up chambers. An exposure opening is located between the film supply and take-up chambers and is configured for exposing successive film frames. A metering or sensing pawl is supported for engaging a film perforation during exposure of the film frame at the exposure opening. A film winding take-up is operated to move each exposed frame from the exposure opening to the film take-up chamber and to advance a fresh frame from the film supply chamber to the exposure opening. When the film metering pawl engages the film perforation, it is intended to prevent frame shift. The reason for this is that it is necessary to keep the film frame stationary during exposure.

Prior art U.S. Pat. No. 3,999,199 issued Dec. 21, 1976 discloses a camera in which a metering or sensing pawl is supported to engage a film perforation between the exposure opening and the film winding take-up during exposure of a film frame at the exposure opening. A compression spring urges the metering pawl opposite to the film take-up direction and towards the exposure opening, and therefore fails to tension the film frame at the exposure opening. Consequently, it is not clear whether frame shift during exposure may occur.

Prior art U.S. Pat. No. 5,708,888 issued Jan. 13, 1998 discloses a camera in which a cantilever beam has one end anchored to a film pressure plate and another end that is intended to engage a film perforation to prevent frame shift during exposure of a film frame. Presumably, a metering pawl or the equivalent is provided in addition to the cantilever beam.

—The Cross-Referenced Application—

The cross-referenced application discloses a camera including a shutter blade supported to move open to expose a frame on a filmstrip, a shutter actuator supported for movement to move the shutter blade open and for movement to be re-cocked, an actuating spring for urging the shutter actuator to move the shutter blade open, and a metering/re-cocking member having a metering pawl for engaging the filmstrip at a perforation during exposure of the frame. The metering/re-cocking member has a re-cocking portion and is supported for movement to move the re-cocking portion against the shutter actuator to move the shutter actuator to be re-cocked. A film tensioning spring urges the metering/re-cocking member, when the metering pawl engages the filmstrip at a perforation, to prevent the frame being exposed from shifting during exposure. The shutter actuator is supported for movement to be spaced from the metering/re-cocking member, when the shutter actuator is re-cocked, to prevent the actuating spring from exerting any influence on the metering pawl when the frame is exposed.

SUMMARY OF THE INVENTION

A camera comprising a main body part with spaced film supply and film take-up chambers and an exposure opening located between the film supply and take-up chambers and configured for exposing an unexposed film frame, a metering pawl for engaging a film perforation during exposure of the film frame at the exposure opening, and a film winding take-up for moving an exposed frame in a film take-up direction from the exposure opening to the film take-up chamber, is characterized in that:

the metering pawl is supported to engage a film perforation between the exposure opening and the film supply chamber during exposure of a film frame at the exposure opening; and a tensioning spring urges the metering pawl substantially opposite to the film take-up direction in order to tension a film frame at the exposure opening.

Since the film length between the metering pawl and the film winding take-up is longitudinally tensioned, the film frame is similarly tensioned at the exposure opening. Thus, the film tensioning positively acts to prevent frame shift during exposure of the film frame.

DETAILED DESCRIPTION OF THE INVENTION

Figure 1:
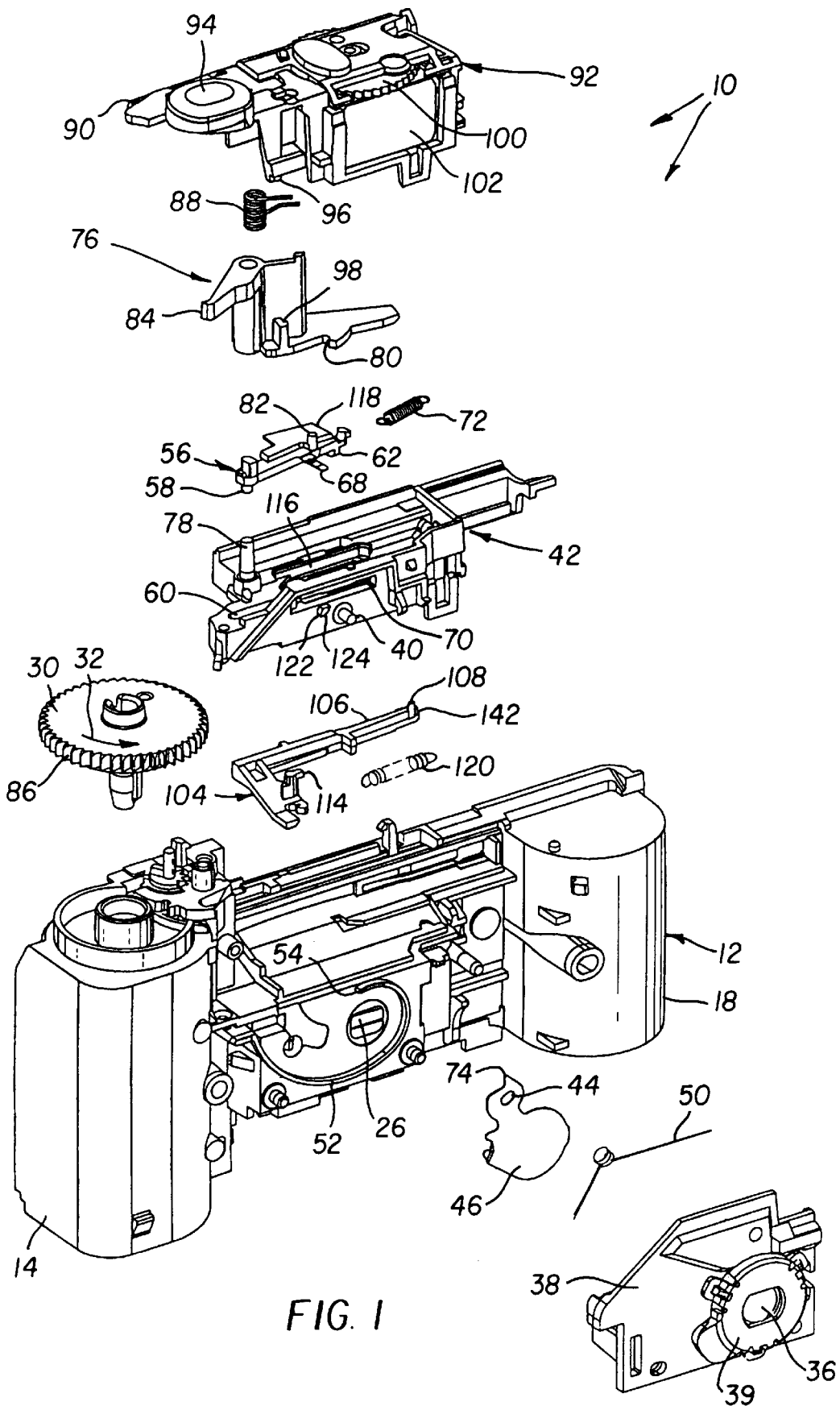
FIG. 1 is a front exploded perspective view of a camera according to a preferred embodiment of the invention.

The invention is disclosed as being embodied preferably in a relatively simple inexpensive camera such as a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–22 partially show a one-time-use camera 10.

Figure 2:
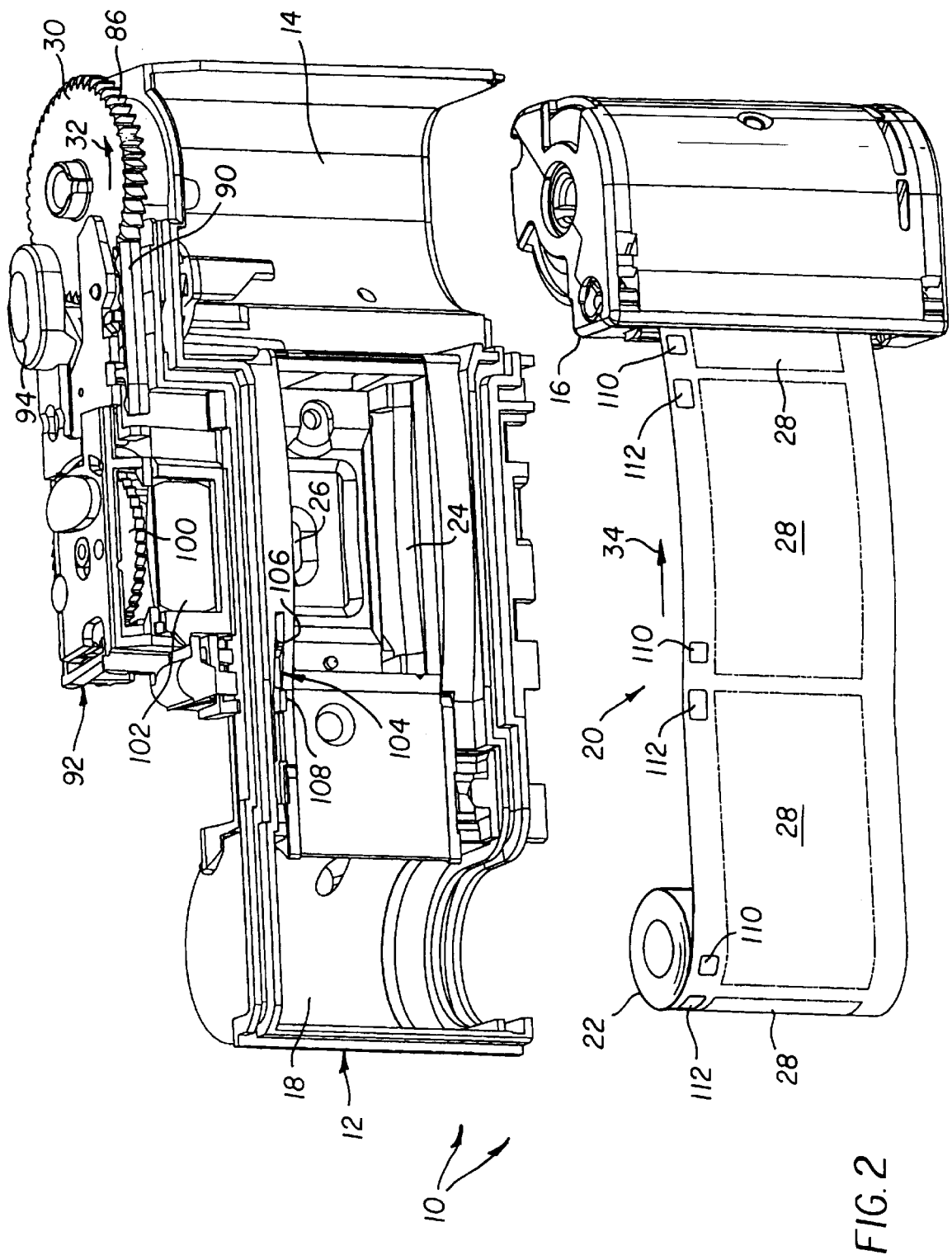
FIG. 2 is a rear perspective view of the camera.

The one-time-use camera 10 is a simple point-and-shoot camera that includes an opaque plastic main body part 12 shown in FIGS. 1 and 2. The main body part 12 has a rearwardly-open film take-up chamber 14 that contains a conventional film cartridge 16, a rearwardly-open film supply chamber 18 that contains an unexposed filmstrip 20 which is prewound during camera manufacture from the film cartridge into an unexposed film roll 22 in the film supply chamber, and a rearwardly-open exposure opening 24 that is behind a front aperture 26 in the main body part. Ambient light passes through the front aperture 26 to the exposure opening 24 in order to expose successive frames 28 of the filmstrip 20. A pair of opaque plastic front and rear cover parts (not shown) house the main body part 12 between them.

Figure 3:
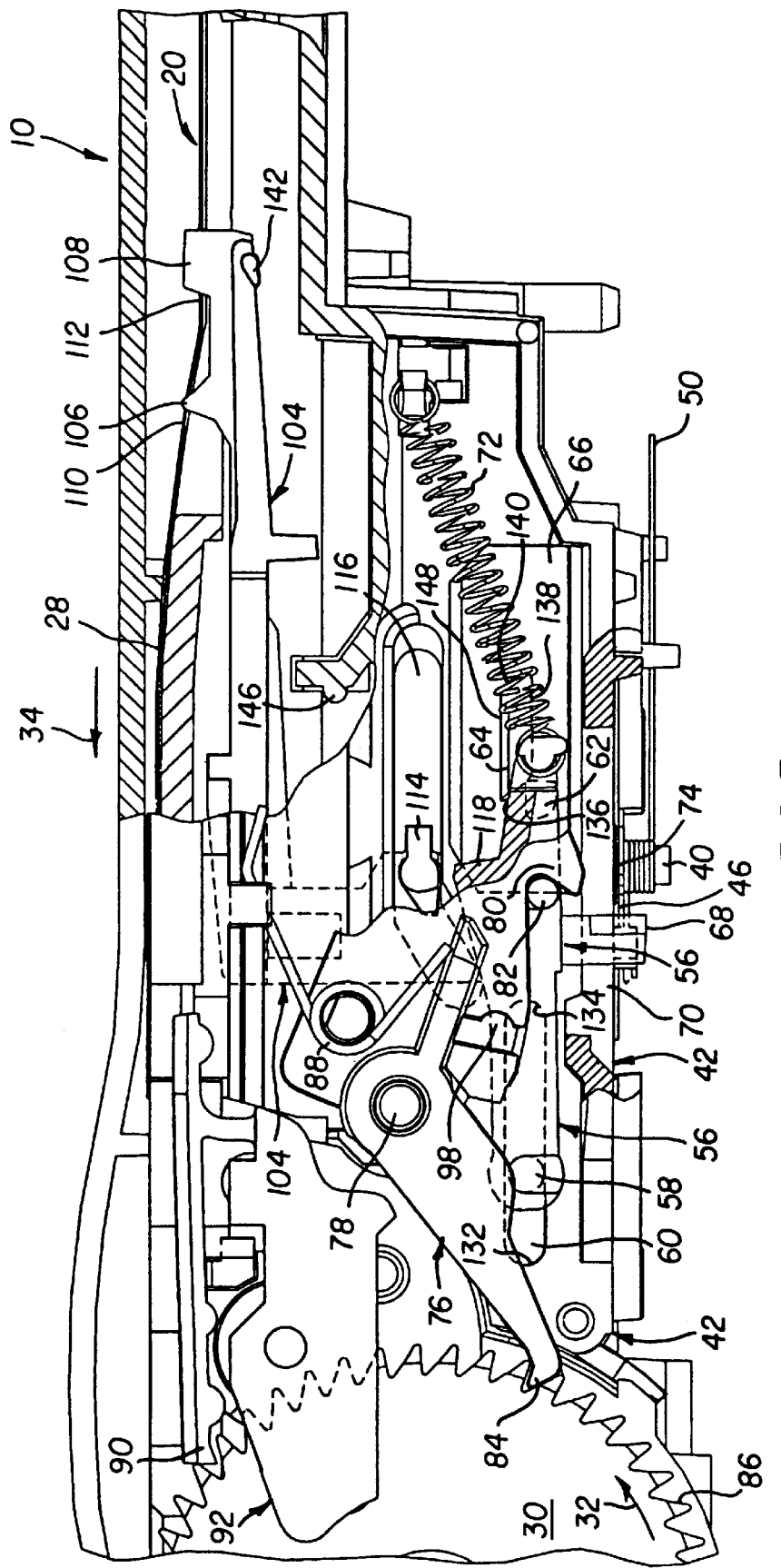
FIG. 3 is a partial-section, plan view of the camera with certain portions removed to facilitate illustration.

A film winding thumbwheel 30 is rotatably engaged with a film spool inside the film cartridge 16 in the film take-up chamber 14. The film winding thumbwheel 30 is manually rotated in a circular film winding direction 32, i.e. counter-clockwise in FIGS. 1 and 2, to wind each frame 28 of the filmstrip 20 that is exposed at the exposure opening 24 into the film cartridge and to advance a fresh frame of the filmstrip from the unexposed film roll 22 to the exposure opening. As indicated in FIGS. 2 and 3, the filmstrip 20 is incrementally moved in a substantially linear film take-up direction 34 from the film supply chamber 18, across the exposure opening 24, to the film take-up chamber 14.

A fixed-focus taking lens 36 is held between a lens plate 38 and a lens retainer 39 which are connected together. The lens plate 38 is connected to the main body part 12 to position the taking lens 36 over the front aperture 26.

Figure 4:
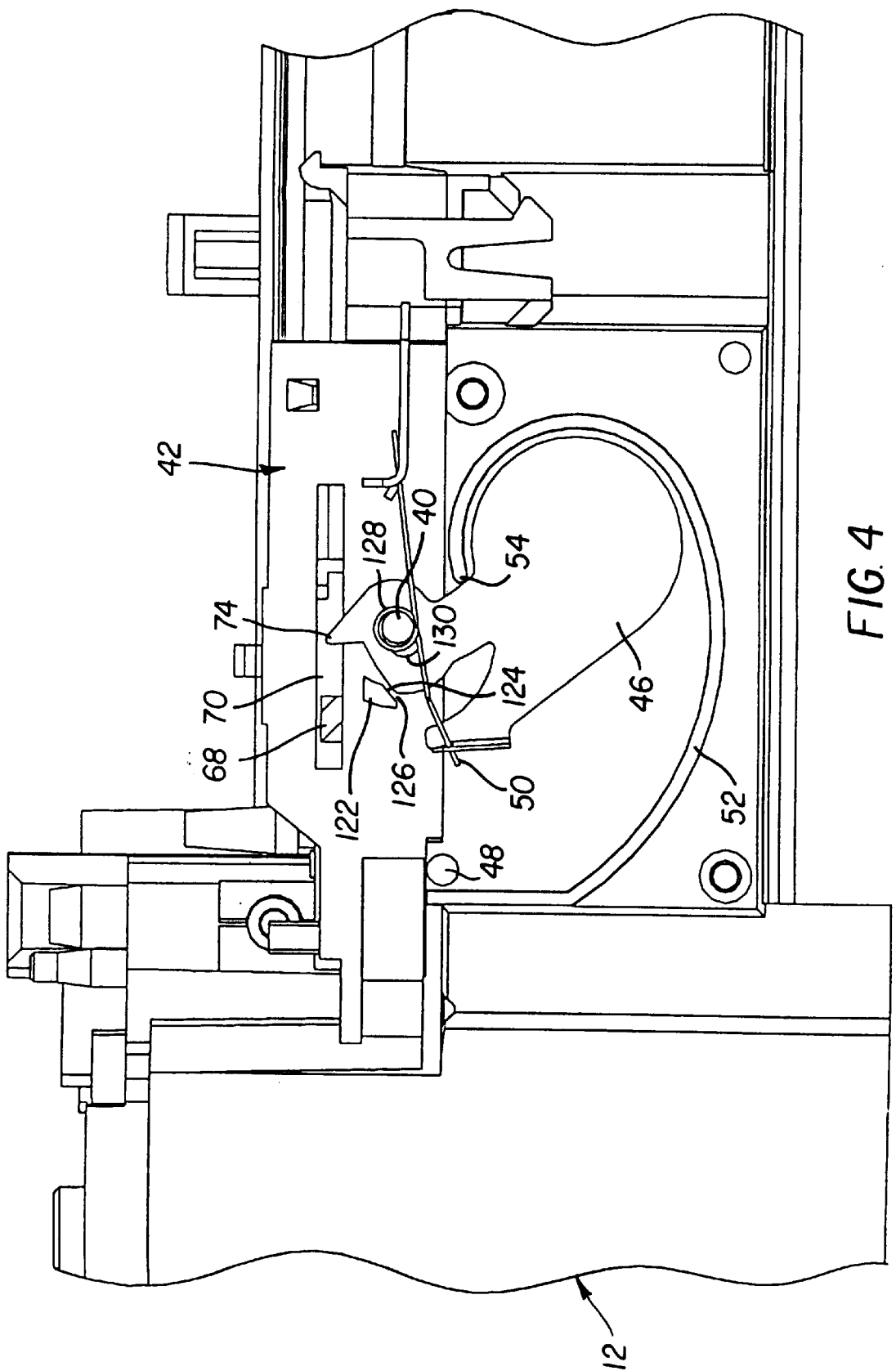
FIG. 4 is a front elevation view of the camera with certain portions removed to facilitate illustration.

A fixed pivot pin 40 on a support piece 42 which is fitted to the main body part 12 projects into a straight or slightly curved slot 44 in a shutter blade 46 to support the shutter blade for translation and pivoting. See FIG. 1. The shutter blade 46 is pivoted open clockwise in FIGS. 8 and 11 and against a limit stop 48 on the main body part 12 to uncover the front aperture 26 in order to permit ambient light to pass from the taking lens 36, through the front aperture, to the exposure opening 24 and is pivoted closed counter-clockwise in FIGS. 12 and 13 to re-cover the front aperture. A closing spring 50 biases the shutter blade 46 to be pivoted closed to re-cover the front aperture 26. A light-intercepting rib 52 on the main body part 12 partially surrounds the shutter blade 46 when the shutter blade is closed as shown in FIG. 4, and it has a blade stop end 54 against which the closing spring 50 urges the shutter blade.

A shutter actuator 56 has a bottom rear guide pin 58 that is confined to movement within a straight top slot 60 in the support piece 42, a bottom front guide pin 62 that is confined to movement around an elongate island 64 within a top cavity 66 in the support piece, and an actuating striker 68 that protrudes outwardly from a straight front slot 70 in the support piece. See FIGS. 1, 3, 4 and 22. A helical tension spring 72 spring biases the shutter actuator 56 substantially to the right in FIGS. 1 and 3 to advance the actuating striker 68 first against a tang 74 on the shutter blade 46, and then over the tang, to pivot the shutter blade open to uncover the front aperture 26. See FIGS. 6, 8 and 11.

A locking member 76 is supported for pivotal movement about a fixed pivot pin 78 on the support piece 42. The locking member 76 has an actuator lock or catch 80 that engages the shutter actuator 56 at an upstanding post 82 on the shutter actuator to prevent the shutter actuator from being moved substantially to the right in FIGS. 1 and 3 via the helical tension spring 72, and it has a rigid thumbwheel lock or pawl 84 that engages any one of a continuous array of peripheral teeth 86 on the film winding thumbwheel 30 to prevent the film winding thumbwheel from being manually rotated in the film winding direction 32. A return spring 88 urges the locking member 76 to pivot clockwise in FIGS. 1 and 3 for the actuator lock 80 to engage the upstanding post 82 on the shutter actuator 56 and for the thumbwheel lock 84 to engage any one of the peripheral teeth 86 on the film winding thumbwheel 30.

A resilient flexible anti-backup pawl 90 on a top piece 92 which is connected to the main body part 12 over the support piece 42 is inherently biased to engage any one of the peripheral teeth 88 on the film winding thumbwheel 30 to prevent reverse (unwinding) rotation of the film winding thumbwheel, i.e. rotation opposite to the film winding direction 32. See FIGS. 1–3.

A shutter release button 94 on the top piece 92 is resiliently cantilevered to permit it to be manually depressed to take a picture. The shutter release button 94 has a depending projection 96 that is swung against an upstanding projection 98 on the locking member 76, when the shutter release button is manually depressed. This pivots the locking member 76 counter-clockwise in FIGS. 1, 3 and 5, for the actuator lock 80 to disengage from the upstanding post 82 on the shutter actuator 56 and for the thumbwheel lock 84 to disengage from any one of the peripheral teeth 86 on the film winding thumbwheel 30.

A frame counter 100 for indicating the number of exposures remaining to be made on the filmstrip 20 is supported for rotation on the top piece 92. See FIG. 1. A direct see-through viewfinder 102 for viewing the subject to be photographed is positioned on the top piece 102, beneath the frame counter 100.

A metering/re-cocking member 104 is supported for movement between the main body part 12 and the support piece 42. The metering/re-cocking member 104 has a film sensing pawl 106 and a film metering pawl 108 that are adapted to engage the filmstrip 20 at successive pairs of film perforations 110 and 112. The film sensing pawl 106 and the film metering pawl 108 are fixed with respect to one another on the metering/re-cocking member 104. A re-cocking projection 114 on the metering/re-cocking member 104 is confined to movement within a bent top slot 116 in the support piece 42 and is adapted to push against a front edge 118 of the shutter actuator 56 to re-cock the shutter actuator, i.e. to return the shutter actuator to its original position shown in FIGS. 3 and 4, when each frame 28 of the filmstrip 20 that is exposed at the exposure opening 24 is wound into the film cartridge 16 and a fresh frame of the filmstrip is advanced from the unexposed film roll 22 to the exposure opening. That is, each time the filmstrip is moved in the film take-up direction 34. See FIGS. 1–3 and 22. A helical tension spring 120 biases the metering/re-cocking member 104 substantially to the right in FIGS. 1 and 3 and to the left in FIG. 2.

A fixed blocking device 122 on the support piece 42 has an inclined blocking edge 124 which is positioned within a predetermined blocking range 126 of the shutter blade 46 to prevent the shutter blade from unintentionally being moved open to uncover the front aperture 26 when the shutter blade is moved accidentally due to mechanical shock, such as when the one-time-use camera 10 is dropped or jarred. The blocking range 126 is defined by a slight clearance space or gap 126 in FIG. 4 which is between the inclined blocking edge 122 and the shutter blade 46. The clearance space 126 permits the shutter blade 46 to be pivoted open to uncover the front aperture 26 when the shutter actuator 56 is moved to pivot the shutter blade open (following manual depression of the shutter release button 94). See FIG. 6.

—Operation—

Beginning with FIGS. 1–5, when the shutter release button 94 is manually depressed to take a picture, its depending projection 96 is swung against the upstanding projection 98 on the locking member 76. This pivots the locking member counter-clockwise in FIG. 5, for the actuator lock 80 to disengage from the upstanding post 82 on the shutter actuator 56 and for the thumbwheel lock 84 to disengage from any one of the peripheral teeth 86 on the film winding thumbwheel 30.

The unexposed frame 28 of the filmstrip 20 which is at the exposure opening 24 is held steady over the exposure opening to prevent any frame shift, because the anti-backup pawl 90 is engaging one of the peripheral teeth 86 on the film winding thumbwheel 30 to prevent reverse (unwinding) rotation of the thumbwheel and the tension spring 120 urges the metering pawl 108 in the film perforation 112 substantially opposite to the film take-up direction 34. Thus, the film frame 28 is longitudinally tensioned across the exposure opening 24 and any frame shift is precluded.

Figure 5:
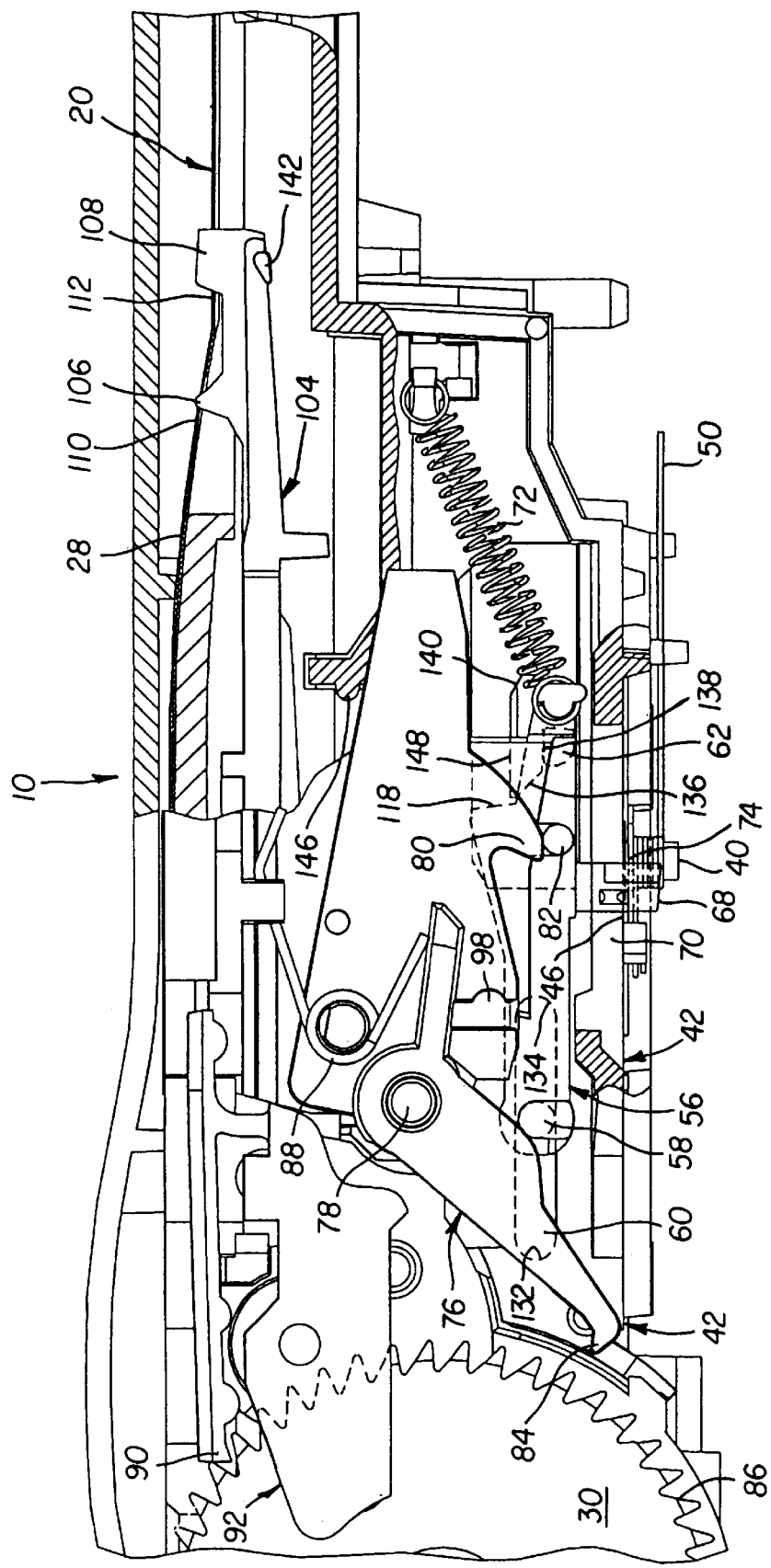
FIG. 5 is similar to FIG. 3, but is depicted when a shutter release button is manually depressed to initiate making an exposure.
Figure 6:
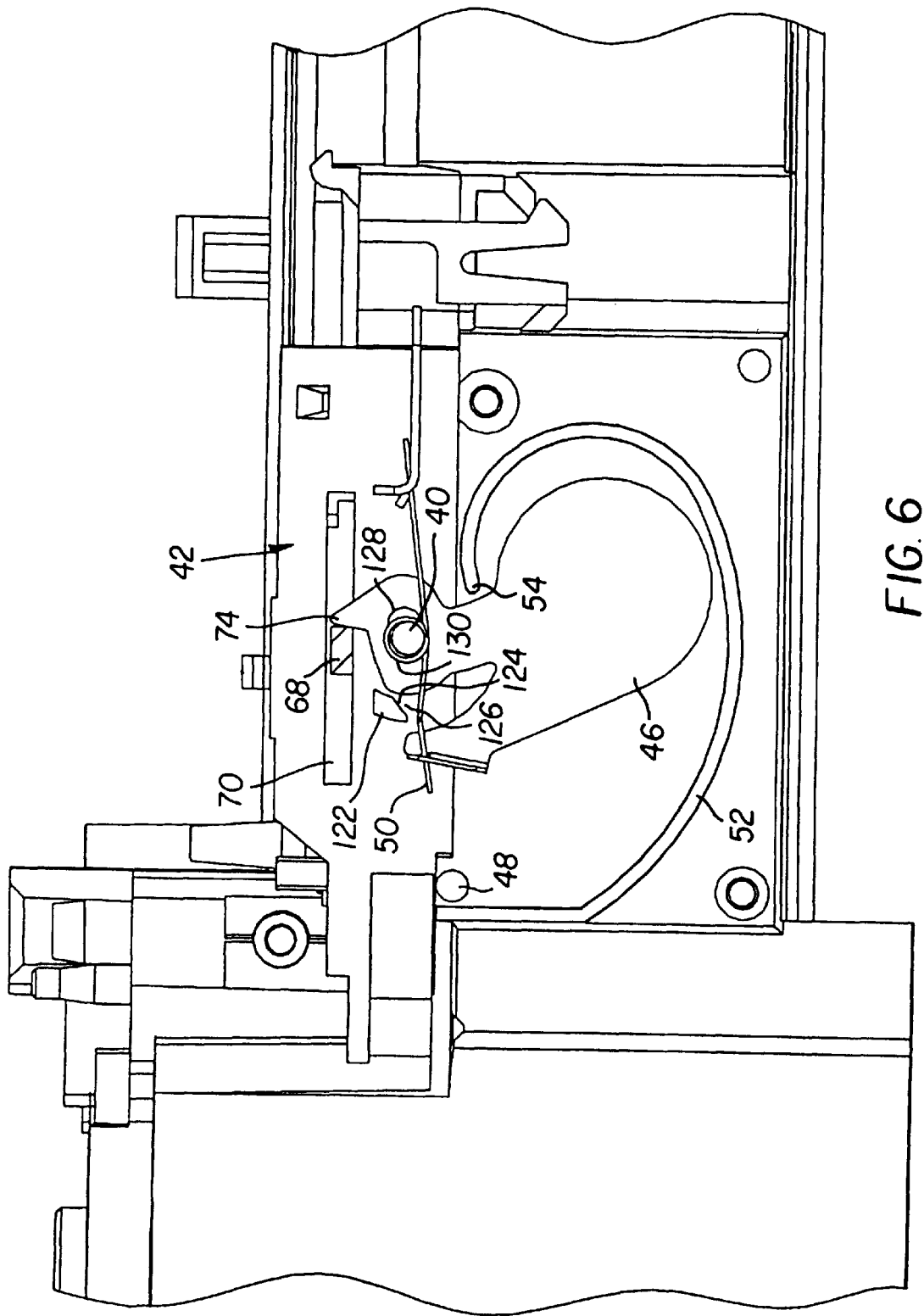
FIG. 6 is similar to FIG. 4, but corresponds in operation to FIG. 5.
Figure 7:
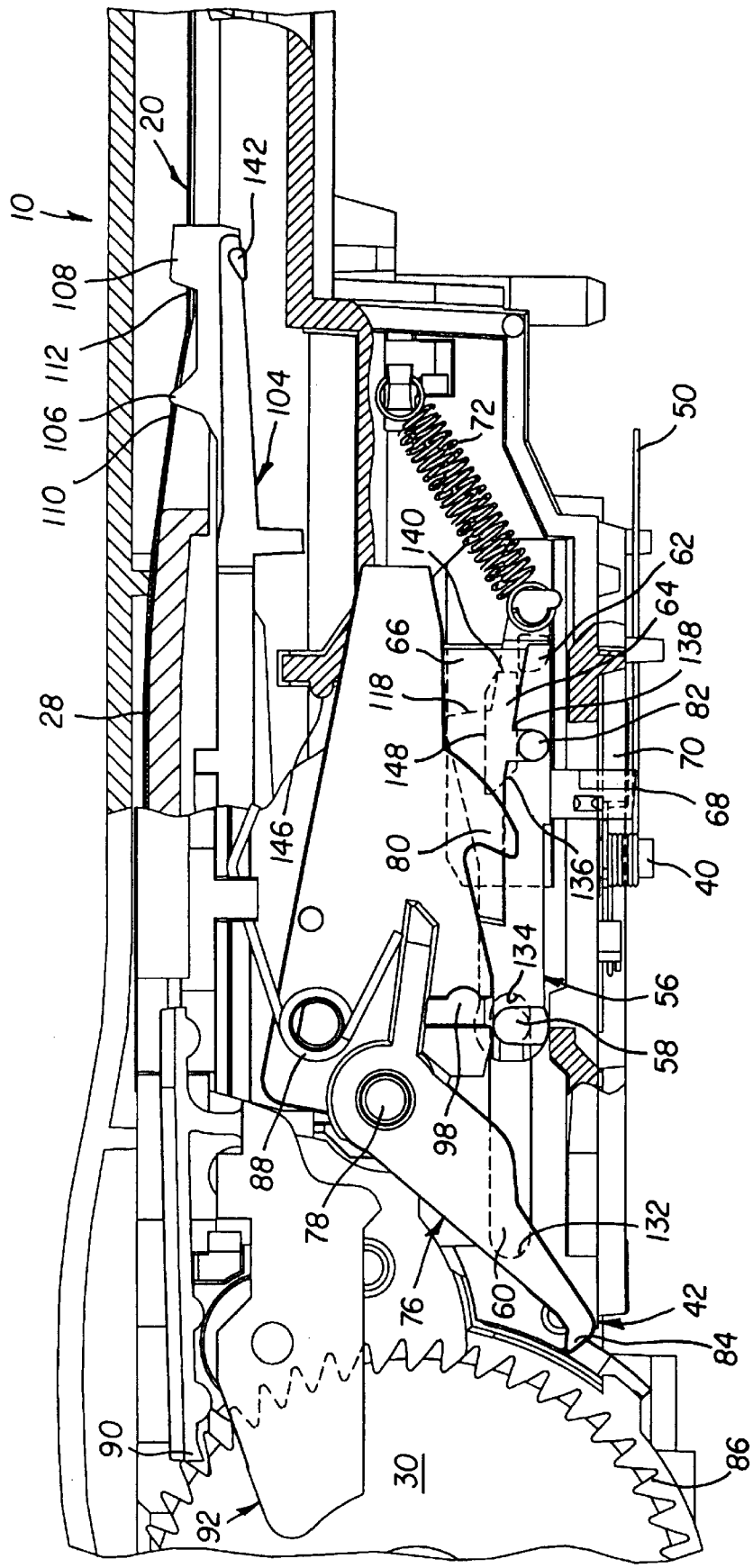
FIG. 7 is a continuation of operation from FIG. 5.
Figure 8:
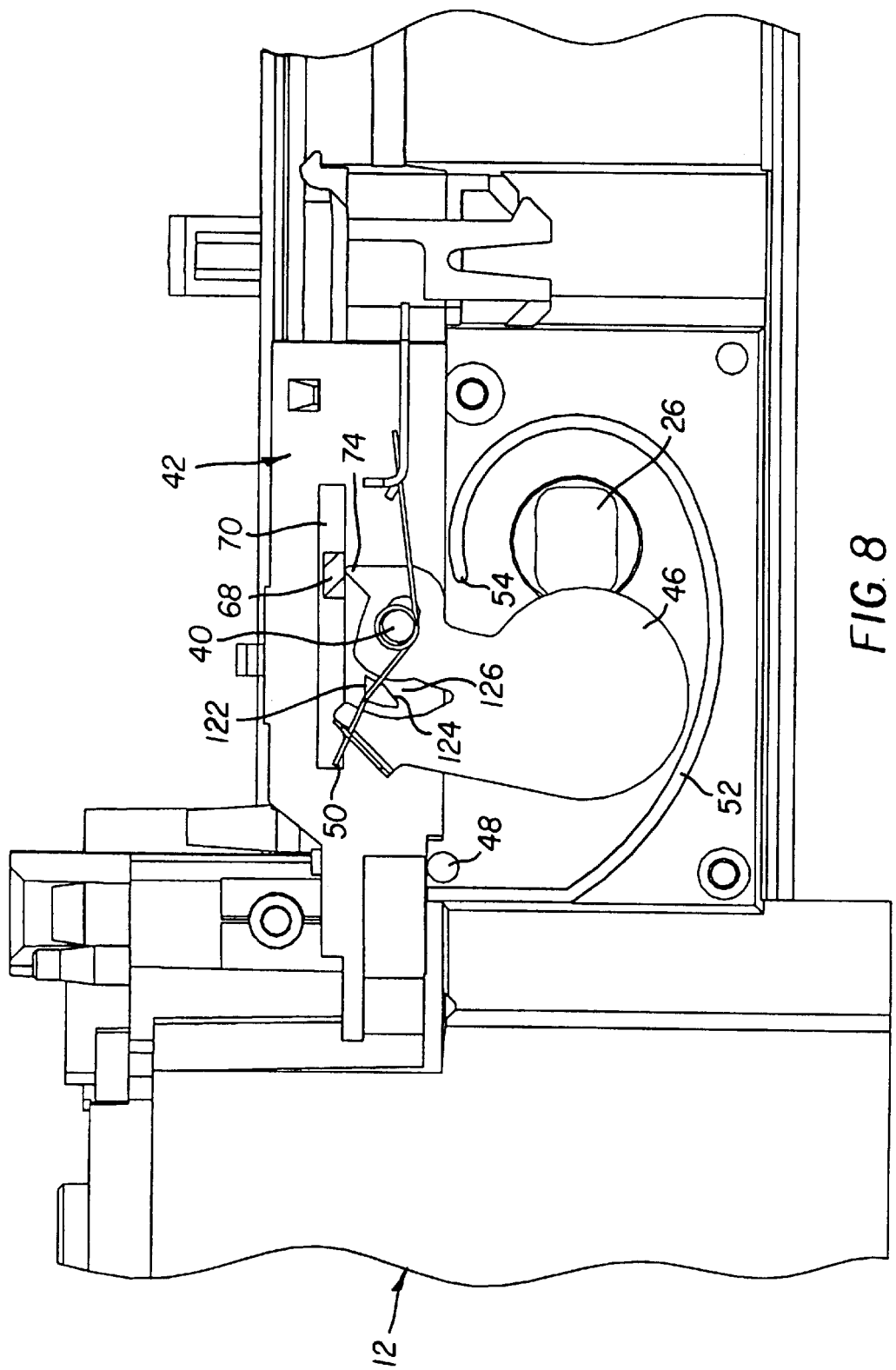
FIG. 8 corresponds in operation to FIG. 7.
Figure 9:
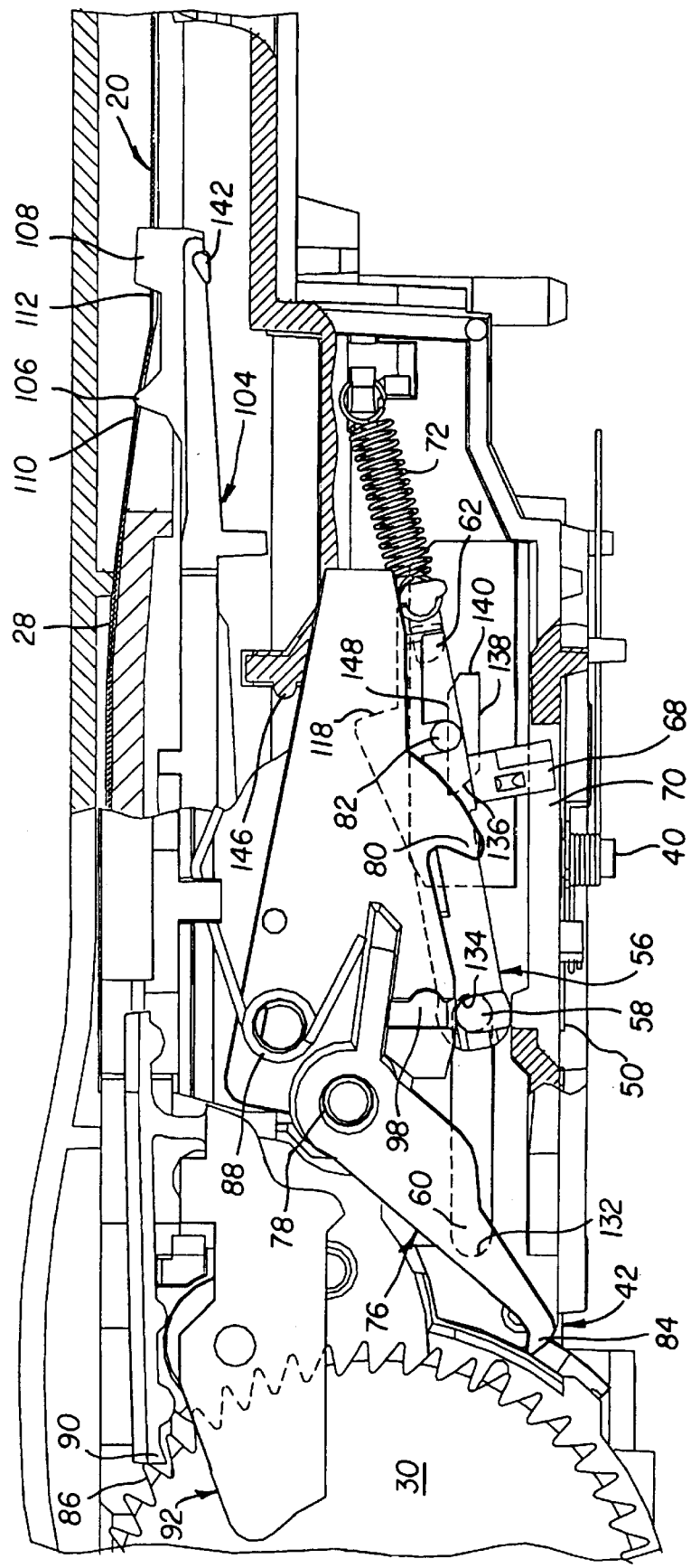
FIG. 9 is a continuation of operation from FIG. 7.

Next, in FIGS. 5 and 6, the tension spring 72 moves the shutter actuator 56 initially to the right to advance the actuating striker 68 forward along the slot 70 in the support piece 42 to against the tang 74 on the shutter blade 46. The shutter blade 46 is translated slightly to the right in FIG. 6 to change from a first closed end 128 of the slot 44 in the shutter blade being against the pivot pin 40 to a second closed end 130 of the slot being against the pivot pin. This moves the shutter blade 46 out of the blocking range 126 of the inclined blocking edge 124, as can be seen by comparing FIGS. 4 and 6. Also, the shutter blade 46 is slightly pivoted clockwise in FIG. 6 to separate from the blade stop end 54 of the light-intercepting rib 52.

Then, in FIGS. 7–11, the tension spring 72 moves the shutter actuator 56 further to the right to advance the actuating striker 68 forward along the slot 70 in the support piece 42 and over the tang 74 on the shutter blade 46. This causes the shutter blade 46 to be pivoted open clockwise in FIGS. 8 and 11 and against the limit stop 48, to uncover the front aperture 26. The shutter blade 46 is pivoted open with the second closed end 130 of the slot 44 in the shutter blade being against the pivot pin 40. Thus, the shutter blade 34 remains out of the blocking range 126 of the inclined blocking edge 124. See FIGS. 7 and 11.

By comparing FIGS. 3, 5, 7 and 9, it can be seen that the bottom rear guide pin 58 on the shutter actuator 56 moves forward within the slot 60 in the support piece 42, and the bottom front guide pin 62 on the shutter actuator moves forward within the cavity 66 in the support piece. The rear guide pin 58 moves from one end 132 of the slot 60 in FIG. 3 to an opposite end 134 of the slot in FIG. 9. The front guide pin 62 moves from one end 136 of the island 64 in the cavity 66 in FIG. 3, along a front side 138 of the island in FIGS. 5 and 7, and around an opposite end 140 of the island in FIG. 9. When the front guide pin 62 is moved to the opposite end 140 of the island 64, the tension spring 72 can pivot the shutter actuator 56 counter-clockwise in FIG. 9 to retract the actuating striker 68 inwardly from the slot 70 in the support piece 42. The actuating striker 68 is pivoted at its rear guide pin 58. The actuating striker 68 must be retracted inwardly from the slot 70 to get out of the way of the tang 74 when the shutter blade 46 is pivoted closed to re-cover the front aperture 26. Otherwise, the actuating striker 68 would block the tang 74 to prevent closing of the shutter blade 46. Alternatively, the actuating striker 68 can be beveled on its underside to not block the tang 74 during closing of the shutter blade 46.

Figure 10:
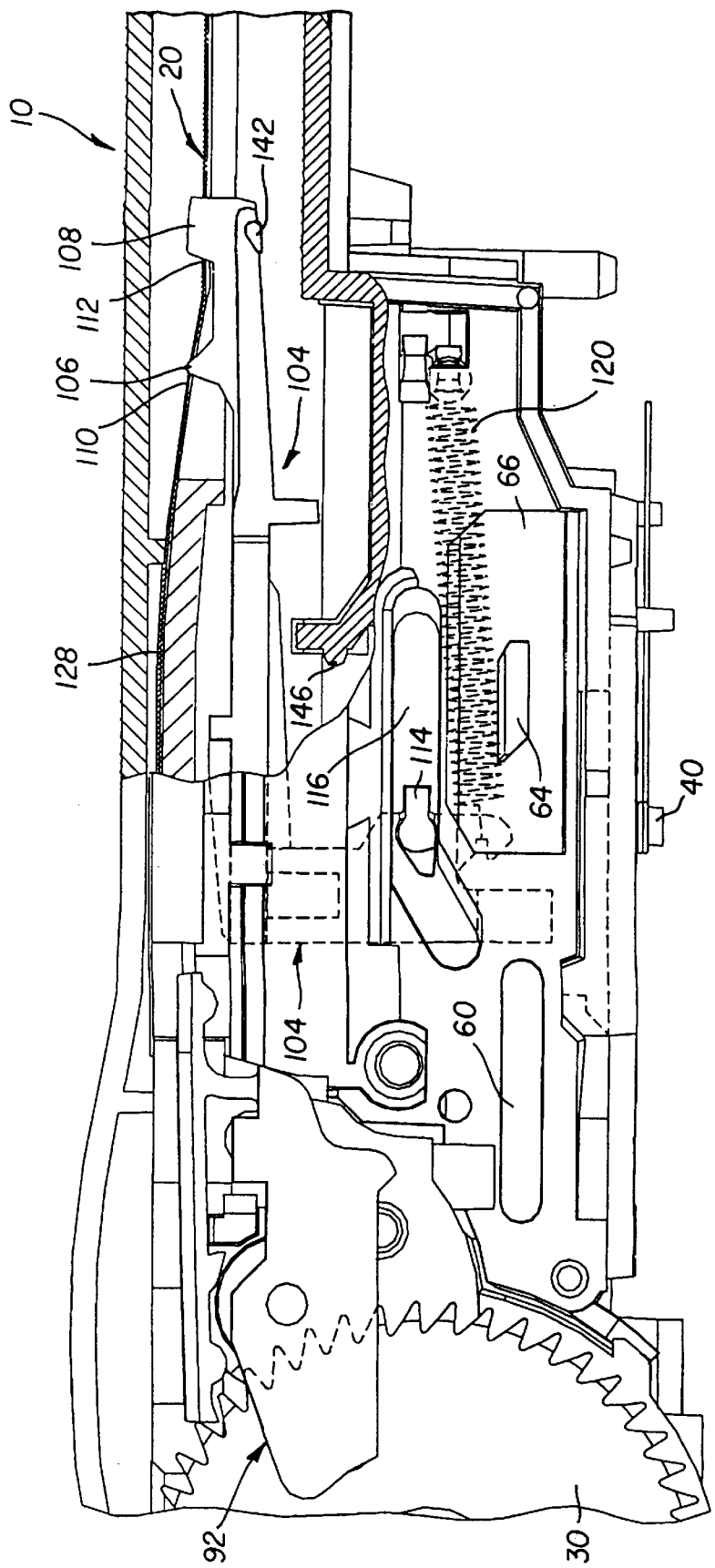
FIG. 10 corresponds in operation to FIG. 9.
Figure 11:
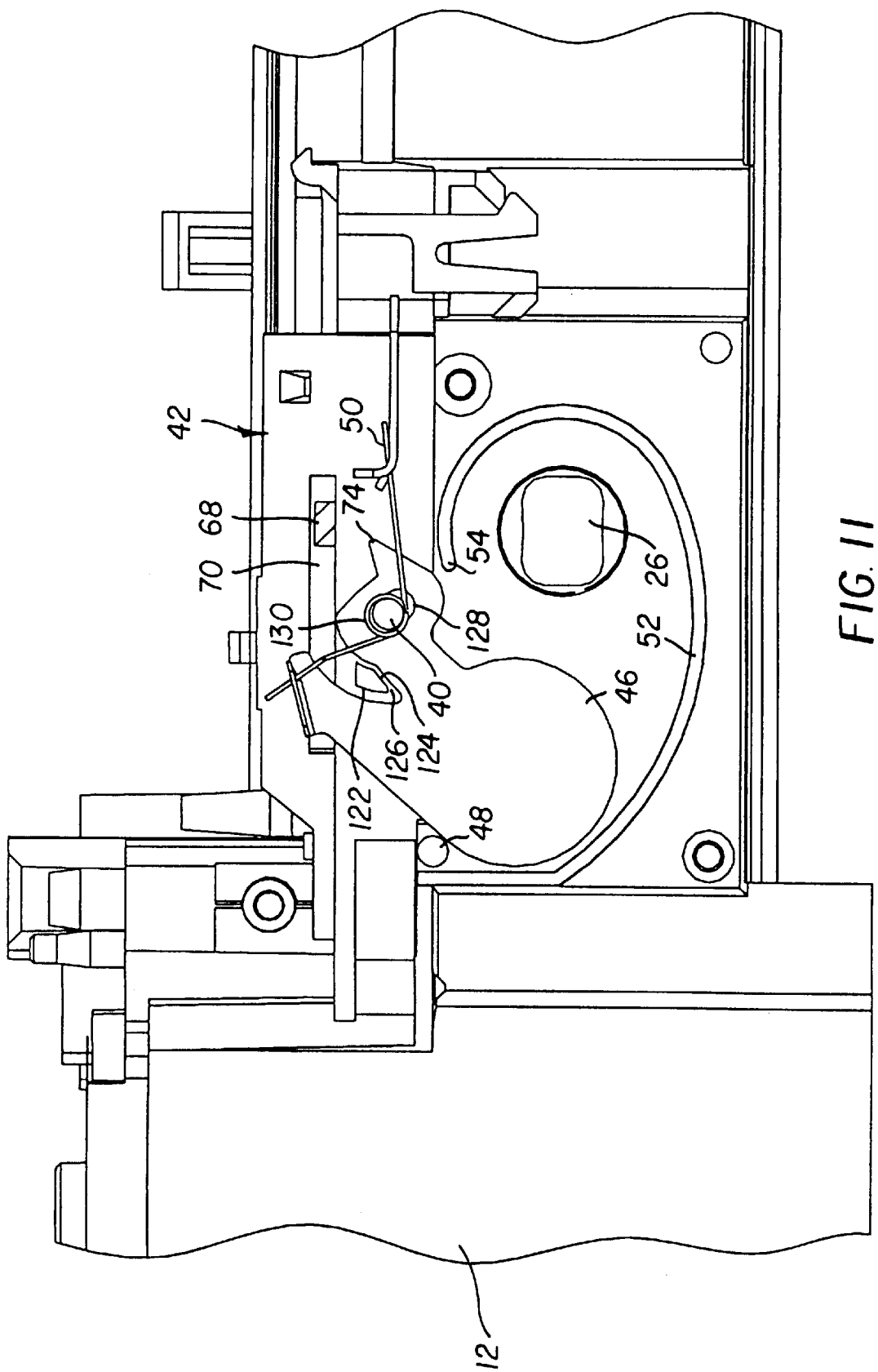
FIG. 11 corresponds in operation to FIG. 9.

As shown in FIG. 10, the metering/re-cocking member 104 remains in the same position as in FIG. 3, with the film sensing pawl 106 and the film metering pawl 108 engaging the filmstrip 20 at one pair of the film perforations 110 and 112.

Figure 12:
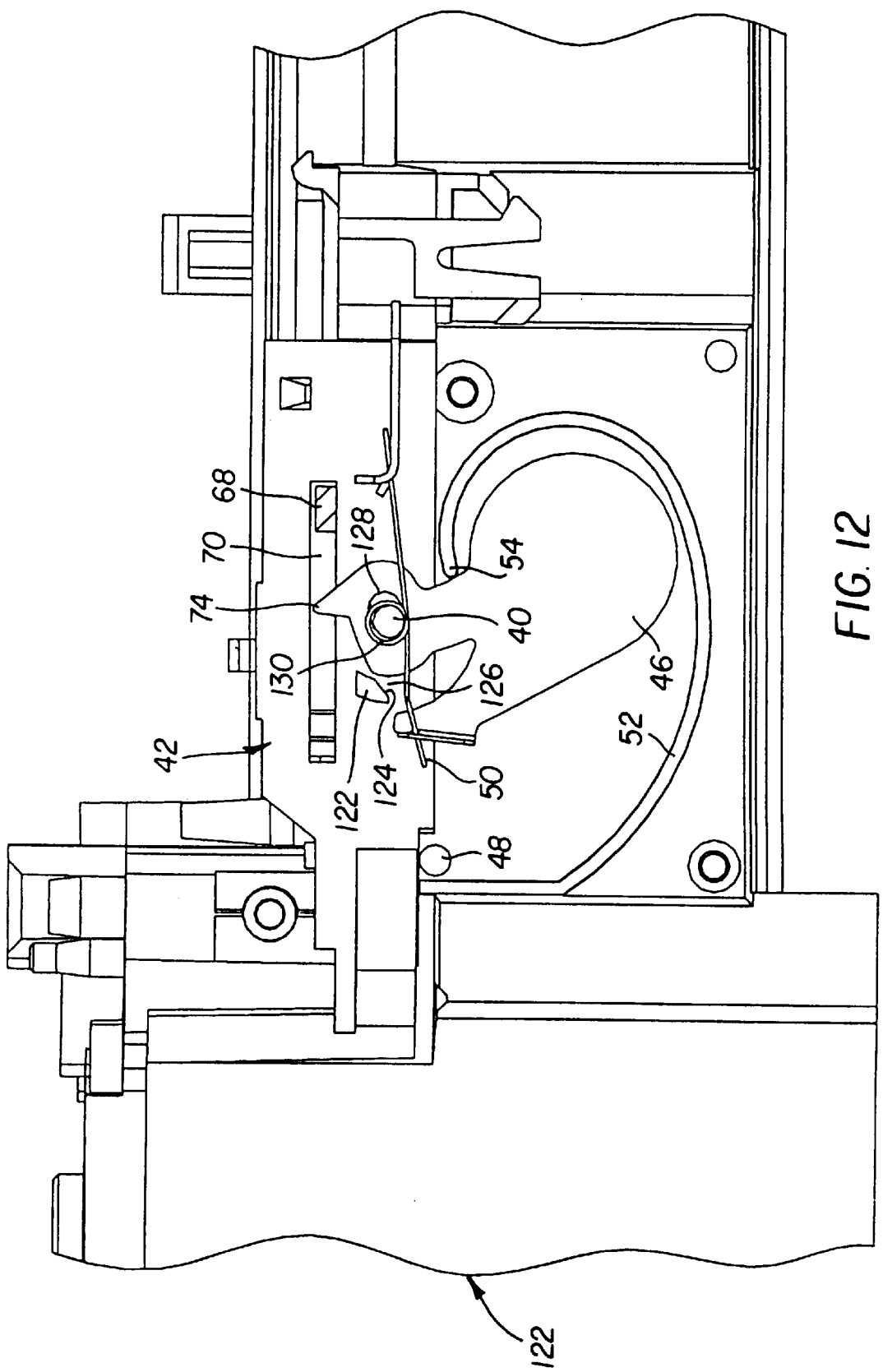
FIG. 12 is a continuation of operation from FIG. 11.

Next, in FIG. 12, the closing spring 50 pivots the shutter blade 46 closed to re-cover the front aperture 26. This is possible because the actuating striker 68 has been retracted inwardly from the slot 70 to get out of the way of the tang 74. The shutter blade 46 is pivoted closed with the second closed end 130 of the slot 44 in the shutter blade being against the pivot pin 40 in FIG. 12.

Figure 13:
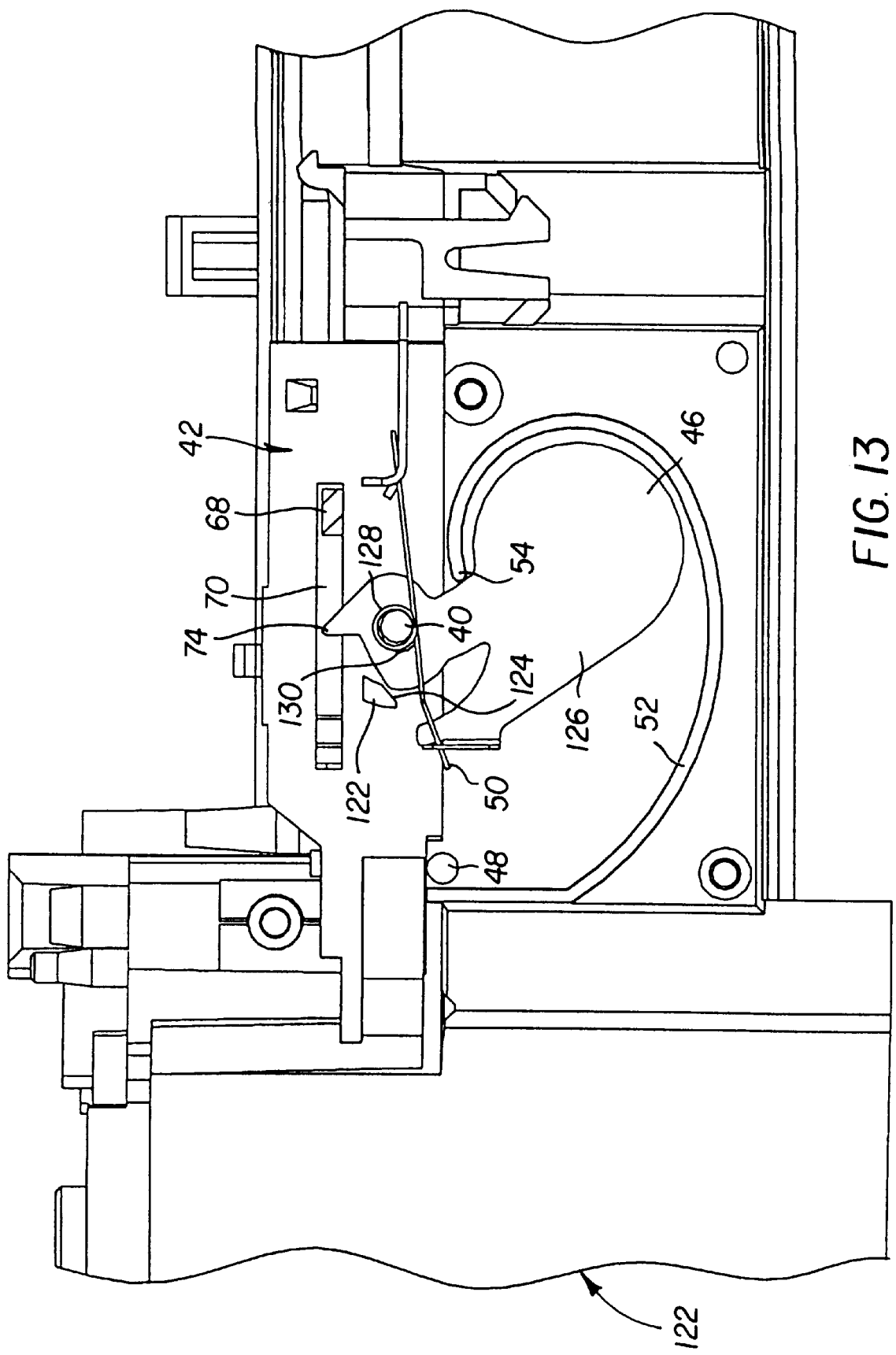
FIG. 13 is a continuation of operation from FIG. 12.

In FIG. 13, the closing spring 50 pivots the shutter blade 46 slightly further to the blade stop end 54 of the light-intercepting rib 52 and then slightly about the blade stop end. This allows the closing spring 50 to translate the shutter blade 46 slightly to the left in FIG. 13 to change from the second closed end 130 of the slot 44 in the shutter blade being against the pivot pin 40 to the first closed end 128 of the slot being against the pivot pin. Then, as shown in FIG. 4, the shutter blade 46 is returned to within the blocking range 126 of the inclined blocking edge 124.

Figure 14:
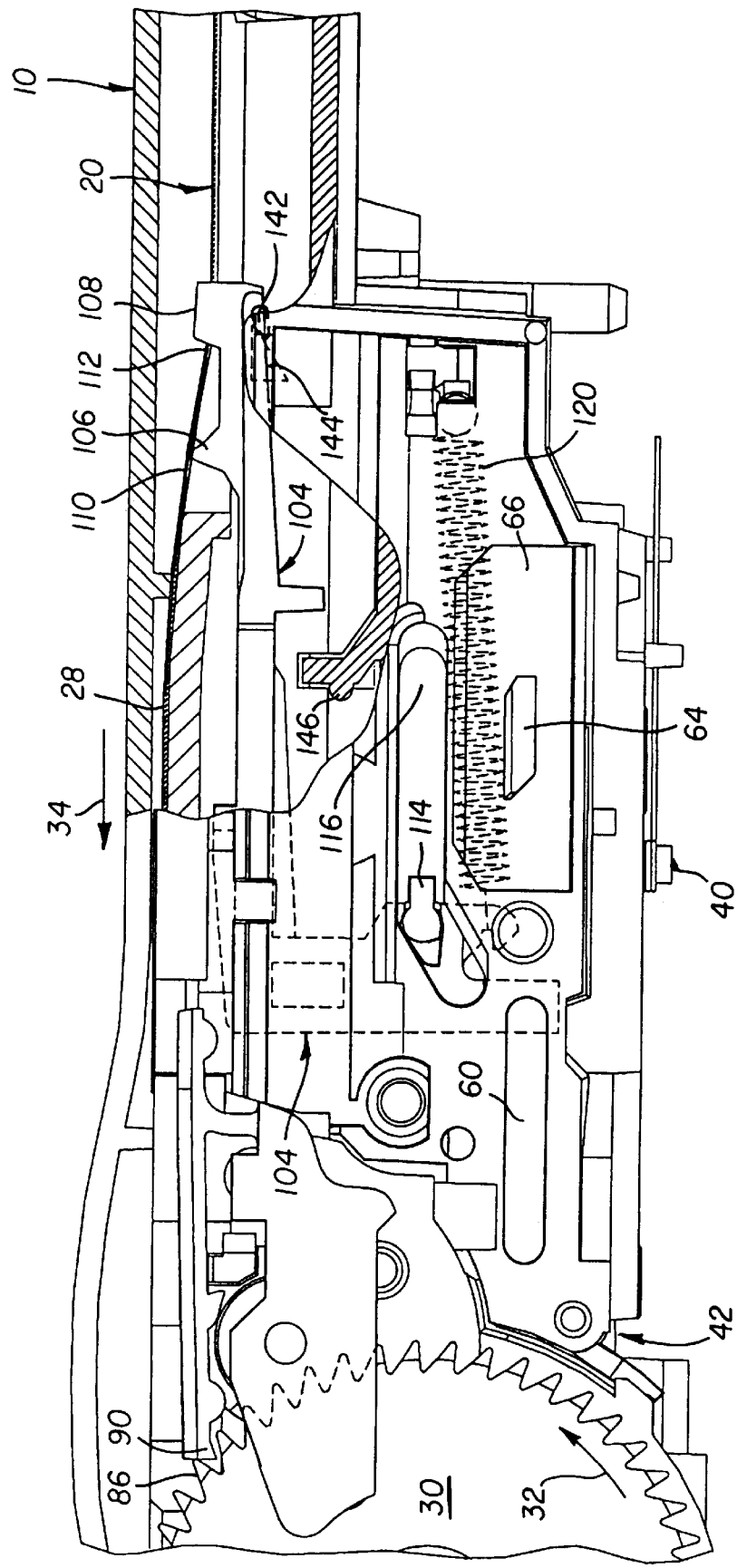
FIG. 14 is a continuation of operation from FIG. 10.

After the picture is taken, and before what is shown in FIG. 14, the shutter release button 94 is manually released to end manual depression of the shutter release button. Thus, the depending projection 96 would be swung away from the upstanding projection 98 on the locking member 76.

In FIG. 14, the film winding thumbwheel 30 is begun to be manually rotated in the film winding direction 32 in order to wind the frame 28 of the filmstrip 20 that is exposed at the exposure opening 24 into the film cartridge 16 and to advance a fresh frame of the filmstrip from the unexposed film roll 22 to the exposure opening. Since the filmstrip 20 is moved in the film take-up direction 34, the film perforation 110 begins to separate from the film sensing pawl 106 of the metering/re-cocking member 104 as shown in FIG. 14. However, the film metering pawl 108 of the metering/re-cocking member 104 remains in the film perforation 112. Thus, the metering/re-cocking member 104 is moved slightly to the left in FIG. 14, stretching the tension spring 120. The re-cocking projection 114 on the metering/re-cocking member 104 is similarly moved within the bent top slot 116 in the support piece 42 as shown in FIG. 14.

Figure 15:
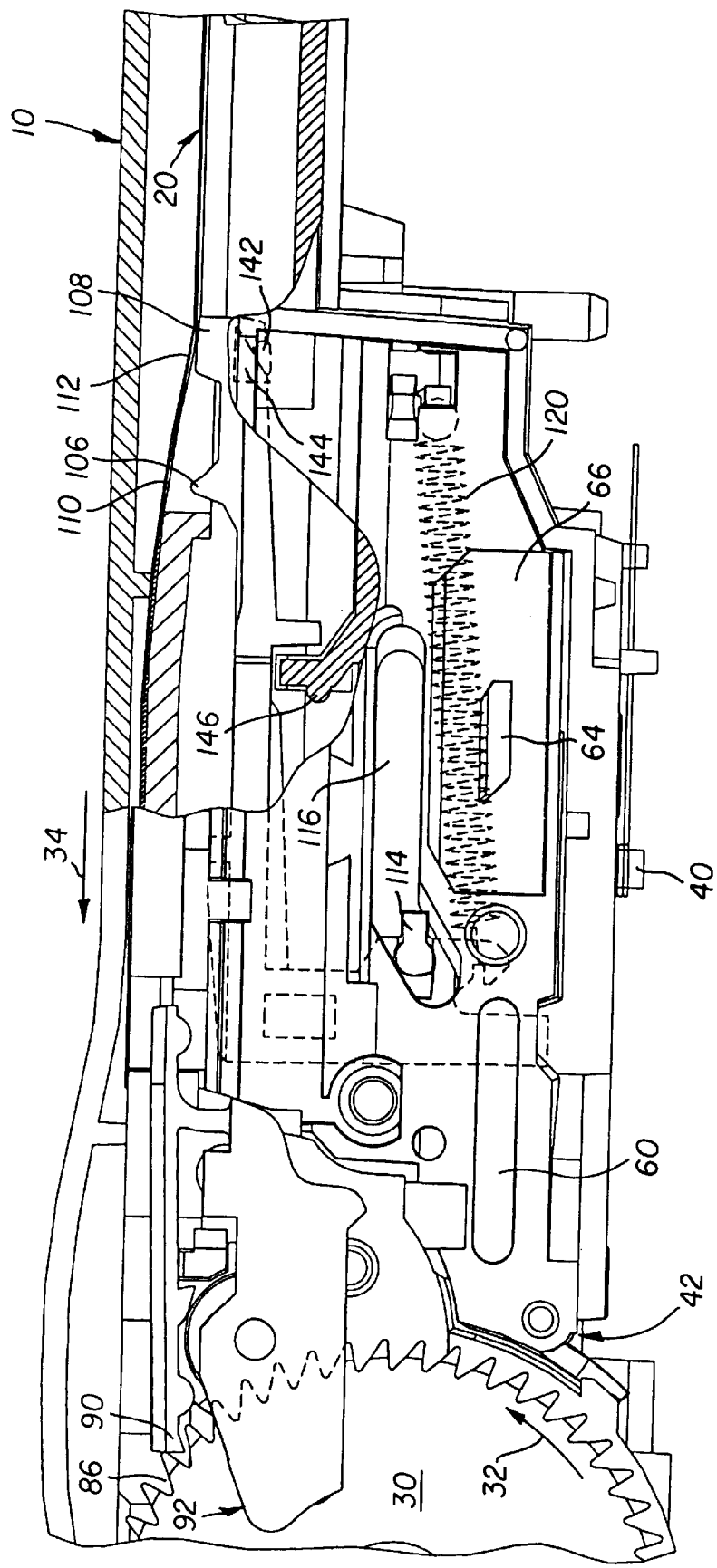
FIG. 15 is a continuation of operation from FIG. 14.

In FIG. 15, the film winding thumbwheel 30 is further rotated in the film winding direction 32, and a follower 142 on the metering/re-cocking member 104 moves along a fixed cam 144 on the support piece 42 to cause the metering/re-cocking member to move slightly to the left and downward in FIG. 15, separating the film metering pawl 108 of the metering/re-cocking member 104 from the film perforation 112. Simultaneously, the re-cocking projection 114 on the metering/re-cocking member 104 is similarly moved within the bent top slot 116 in the support piece 42 as shown in FIG. 15.

Figure 16:
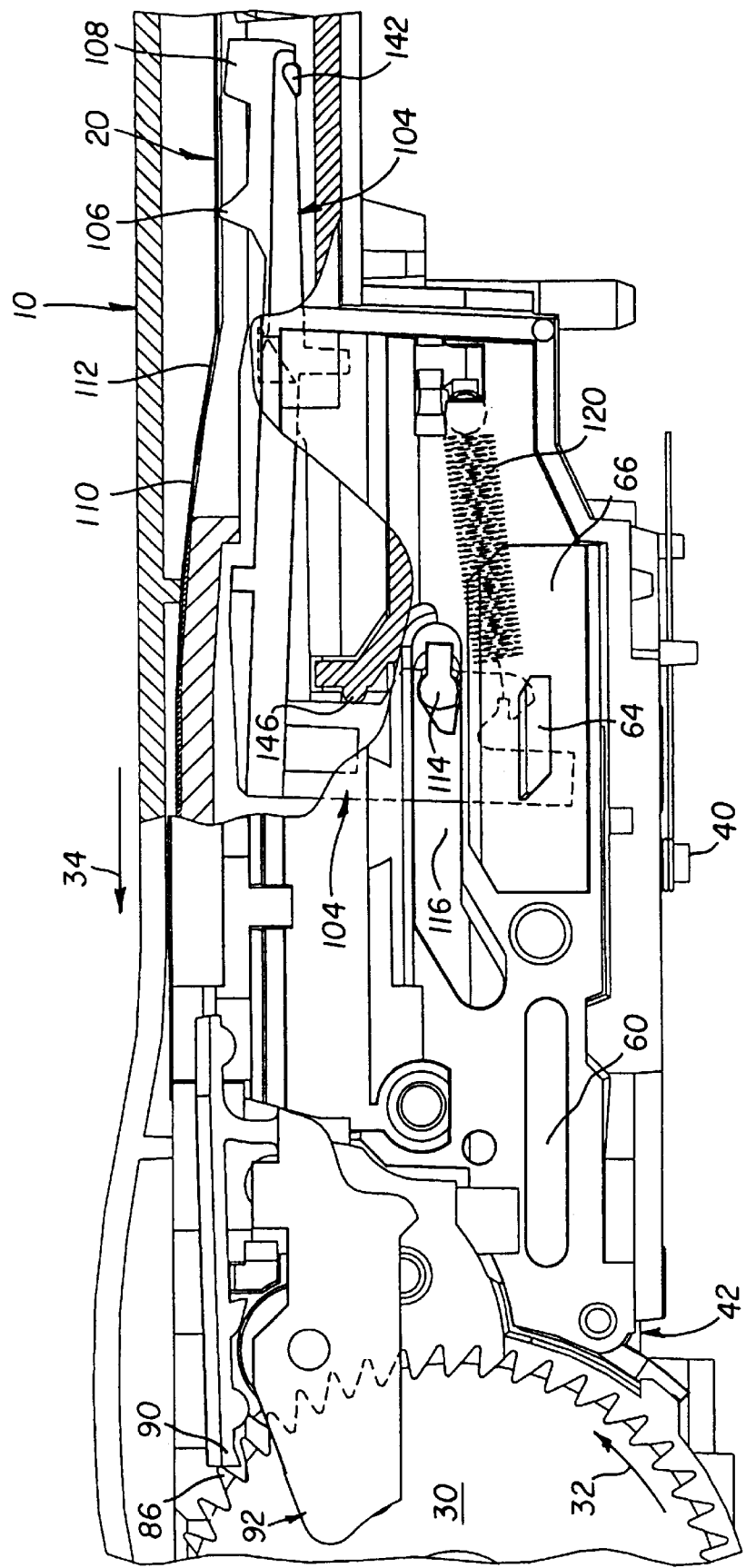
FIG. 16 is a continuation of operation from FIG. 15.
Figure 17:
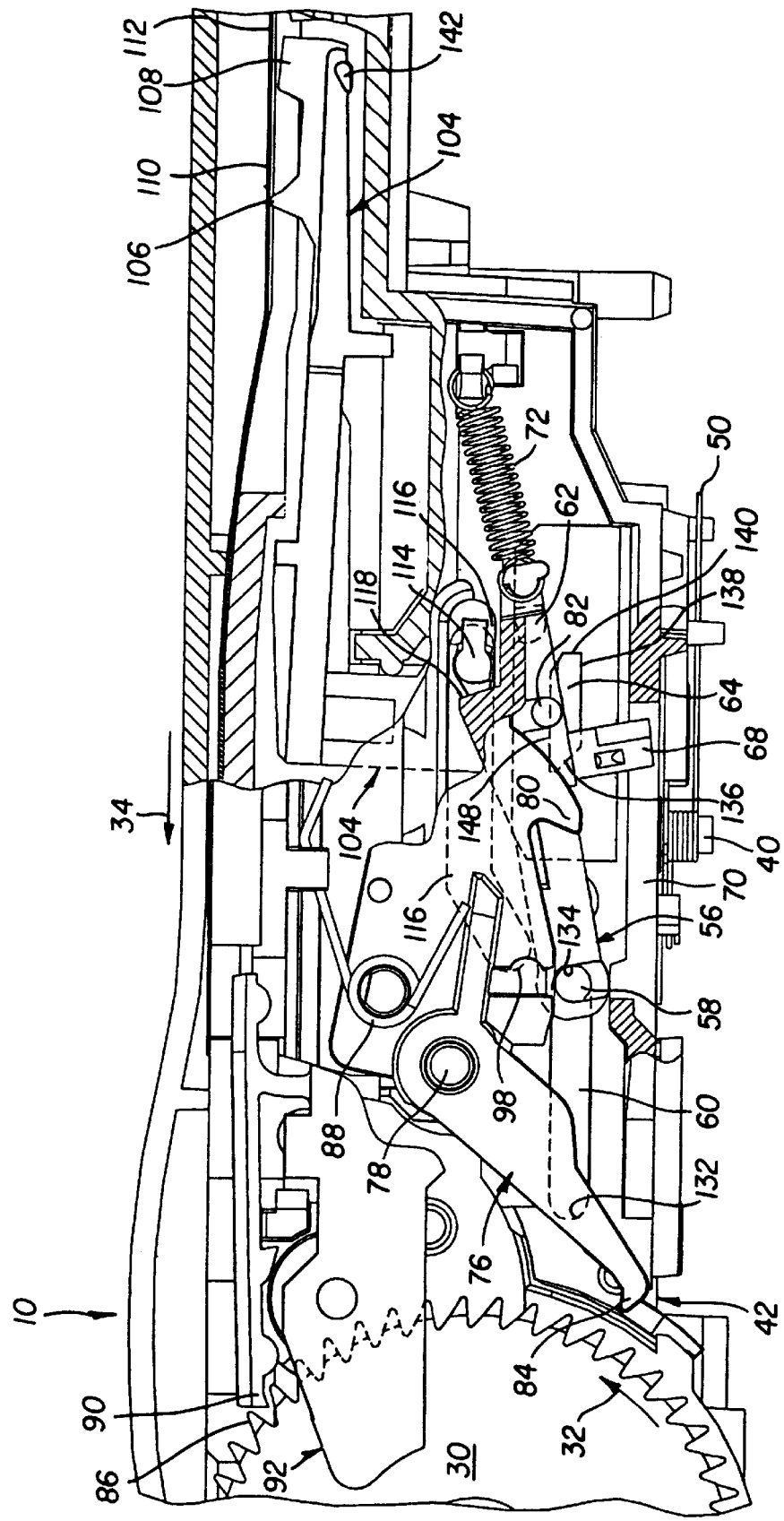
FIG. 17 is a continuation of operation from FIG. 16.

In FIGS. 16 and 17, the film winding thumbwheel 30 is further rotated in the film winding direction 32, and the tension spring 120 returns the metering/re-cocking member 104 to the right to re-position the film sensing and metering pawls 106 and 108 of the metering/re-cocking member against the filmstrip 20. At this time, the film sensing and metering pawls 106 and 108 tend to bear lightly against the filmstrip 20 due to the urging of the tension spring 120.

Figure 18:
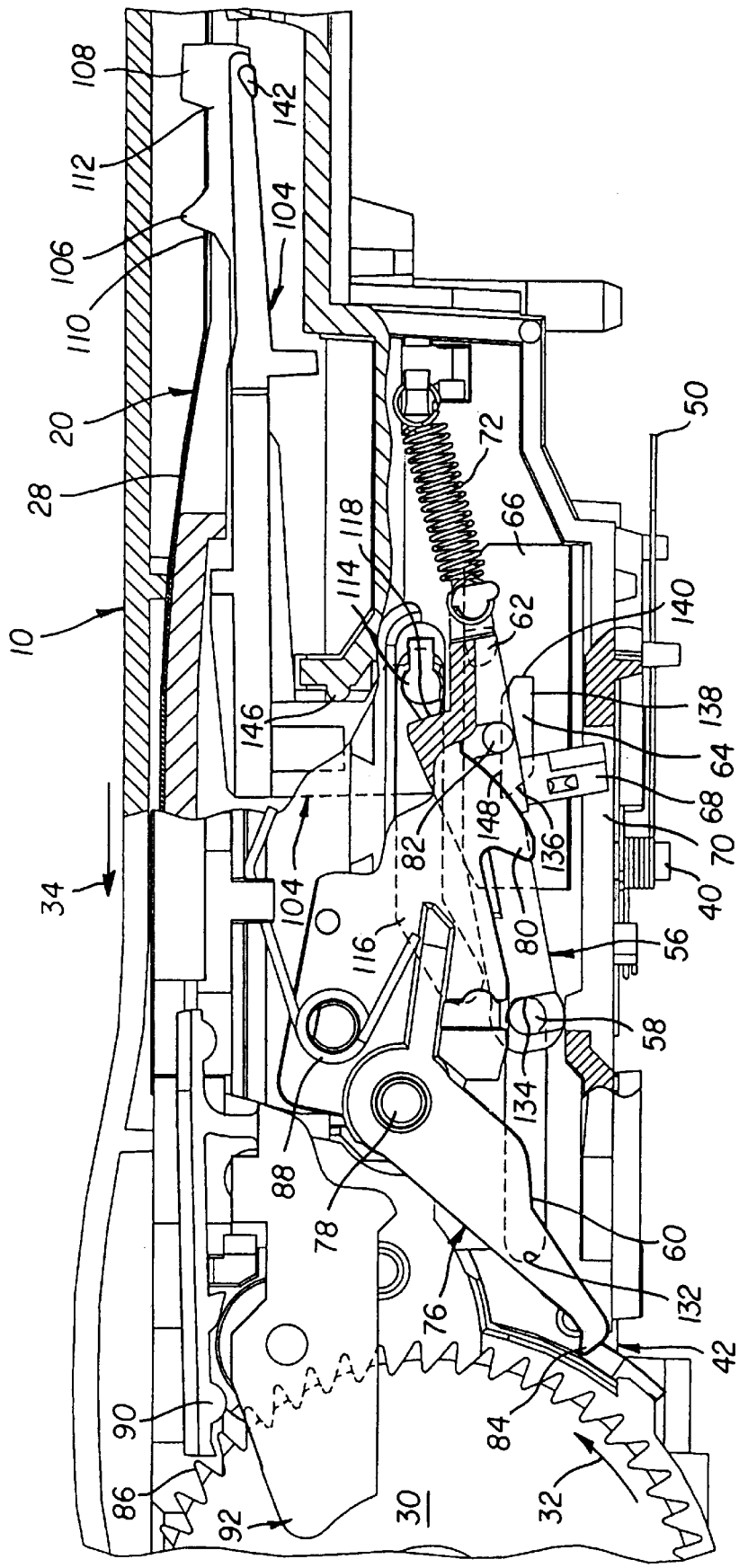
FIG. 18 is a continuation of operation from FIG. 17.

In FIG. 18, the film winding thumbwheel 30 is further rotated in the film winding direction 32, and the film sensing and metering pawls 106 and 108 of the metering/re-cocking member 104 drop into another (the next) pair of the film perforations 110 and 112 to re-engage the filmstrip 20. The metering/re-cocking member 104 is pivoted slightly counter-clockwise in FIG. 18 about a fixed nub 146 on the support piece 42.

Figure 19:
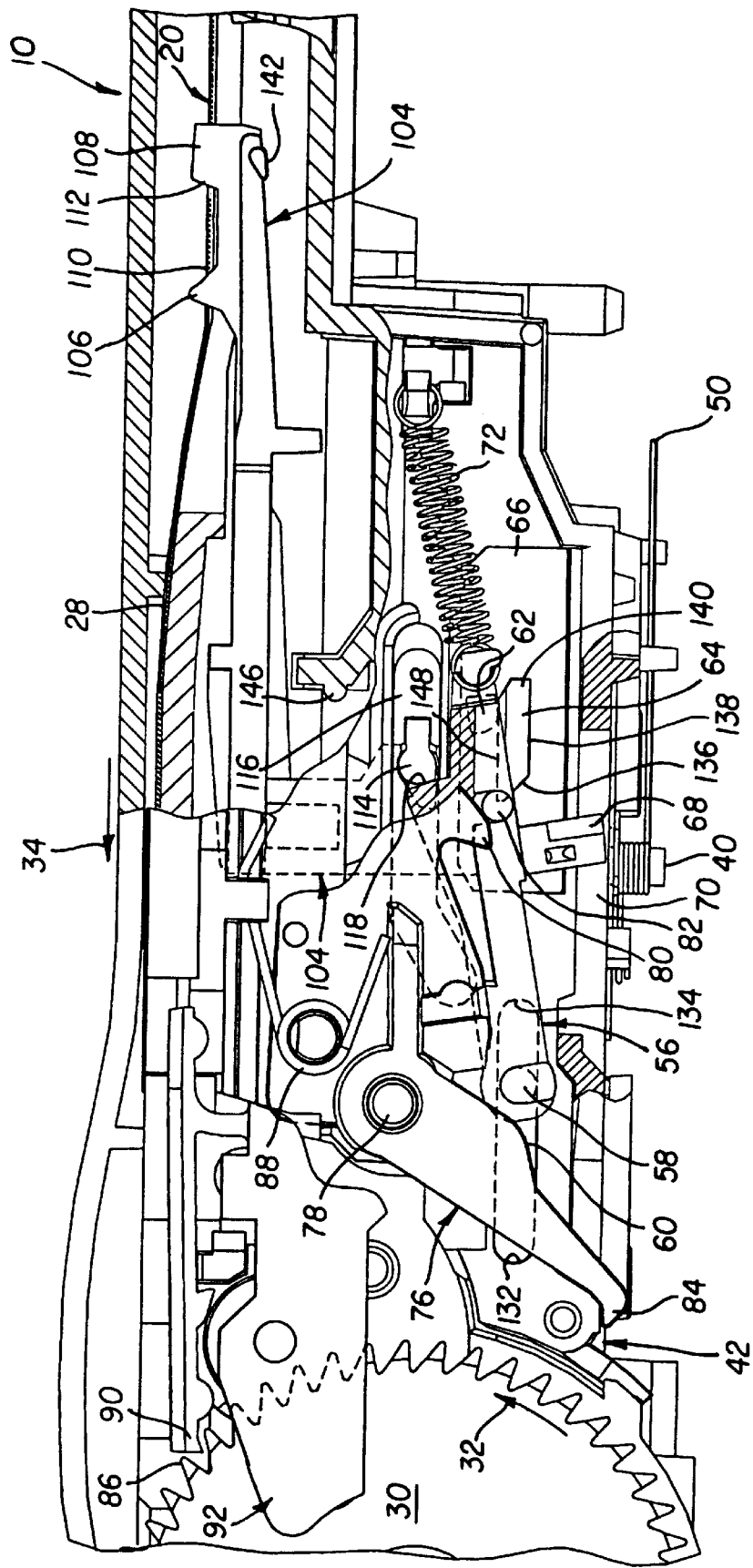
FIG. 19 is a continuation of operation from FIG. 18.

In FIG. 19, the film winding thumbwheel 30 is further rotated in the film winding direction 32, which causes the metering/re-cocking member 104 to again begin to move to the left (since the film sensing and metering pawls 106 and 108 of the metering/re-cocking member 104 are now in another pair of the film perforations 110 and 112). This moves the re-cocking projection 114 on the metering/re-cocking member 104 against the front edge 118 of the shutter actuator 56 to begin to re-cock the shutter actuator, i.e. to begin to return the shutter actuator to its original position shown in FIGS. 3 and 4. The upstanding post 82 on the shutter actuator 56 bears against the actuator lock 80 on the locking member 76 to pivot the locking member slightly counter-clockwise in FIG. 19, which serves to decrement the frame counter 100 by "1." The front guide pin 62 on the shutter actuator 56 is moved from the end 140 of the island 64 in the cavity 66 in the support piece 42 to along a rear side 148 of the island. The actuating striker 68 therefore remains retracted inwardly from the slot 70 in the support piece 42. This allows the shutter actuator 56 to be re-cocked, i.e. returned to its original position shown in FIGS. 3 and 4, without the tang 74 on the shutter blade 46 obstructing the actuating striker 68.

Figure 20:
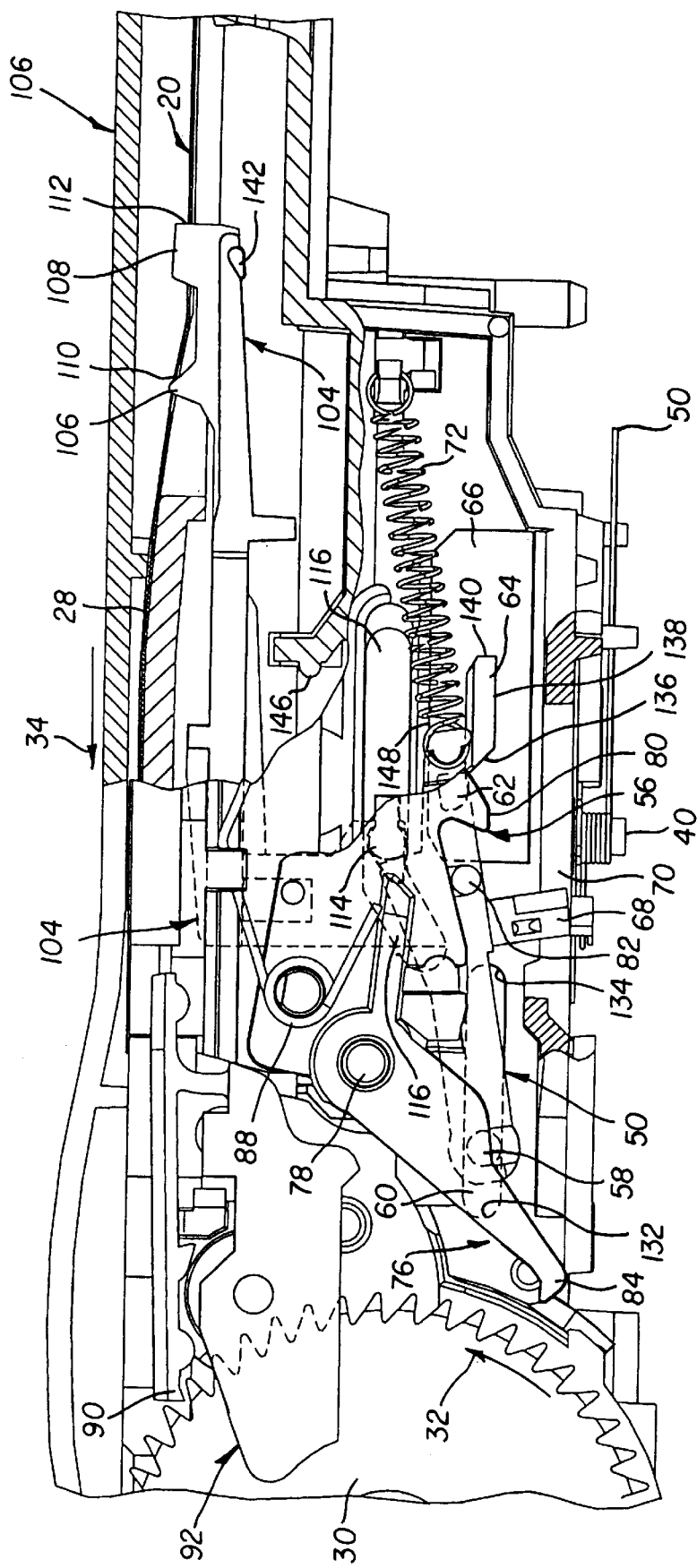
FIG. 20 is a continuation of operation from FIG. 19.

In FIG. 20, the film winding thumbwheel 30 is further rotated in the film winding direction 32, and the metering/re-cocking member 104 is further moved to the left. Movement of the metering/re-cocking member 104 further to the left in FIG. 20 causes the re-cocking projection 114 on the metering/re-cocking member to push the front edge 118 of the shutter actuator 56 to continue to re-cock the shutter actuator, i.e. to continue to return the shutter actuator to its original position shown in FIGS. 3 and 4. Also, the front guide pin 62 on the shutter actuator 56 is moved from the rear side 148 of the island 64 in the cavity 66 in the support piece 42 to the end 136 of the island.

Figure 21:
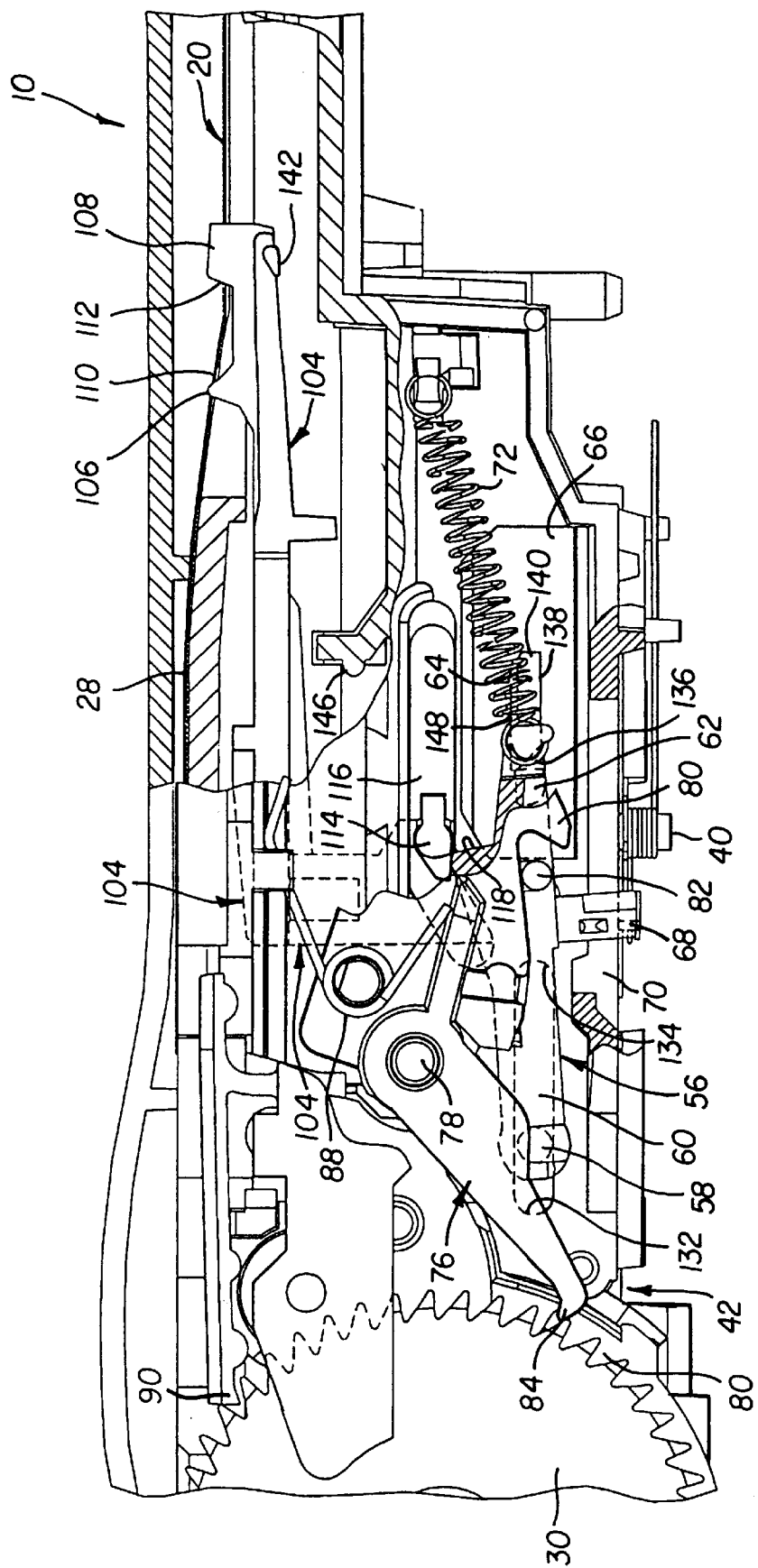
FIG. 21 is a continuation of operation from FIG. 20.
Figure 22:
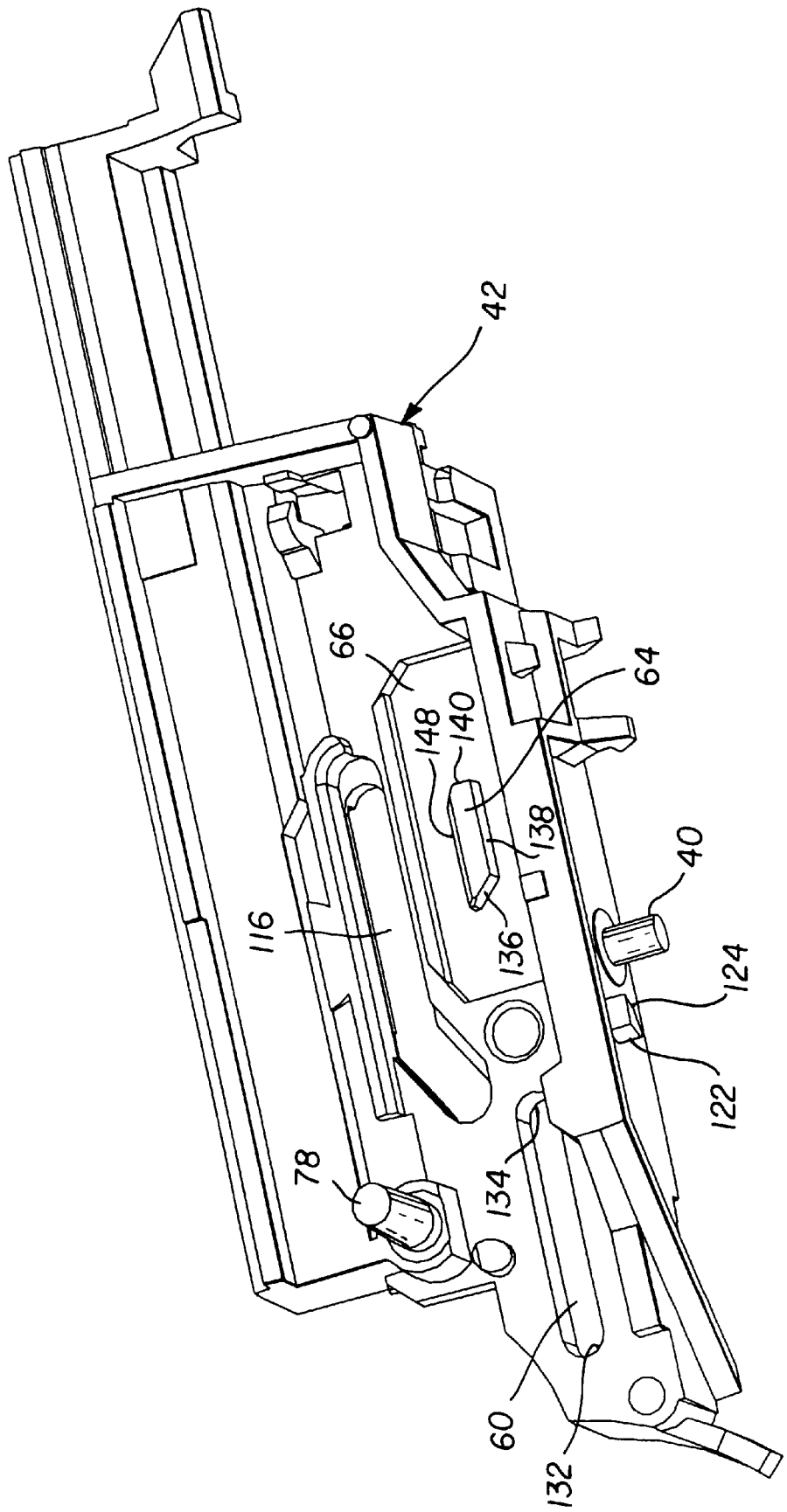
FIG. 22 is a top perspective view of a support piece, shown from its top in FIG. 1.

When the front guide pin 62 on the shutter actuator 56 is moved to the end 136 of the island 64 in the cavity 66 in the support piece 42, the return spring 88 can begin to pivot the locking member 76 clockwise in FIG. 21. One edge of the locking member 76 then begins to push against the upstanding post 82 on the shutter actuator 56 to begin to pivot the shutter actuator 56 clockwise in FIG. 21. Thus, in FIG. 21, the front edge 118 of the shutter actuator 56 separates from the re-cocking projection 114 on the metering/re-cocking member 104, and the front guide pin 62 on the shutter actuator begins to be moved around the end 136 of the island 64 in the cavity 66 in the support piece 42. The return spring 88 continues to pivot the locking member 76 clockwise in FIG. 21. Consequently, the thumbwheel lock 84 begins to engage any one of the peripheral teeth 86 on the film winding thumbwheel 30, and the actuating striker 68 begins to re-enter the slot 70 in the support piece 42 (ahead of the tang 74 on the shutter blade 46) as shown in FIGS. 3 and 4.

Finally, in FIG. 3, the actuator lock 80 re-engages the upstanding post 82 on the shutter actuator 56 to prevent the shutter actuator from being moved substantially to the right in FIG. 3 via the spring 72. The re-cocking projection 114 on the metering/re-cocking member 104 is kept spaced from the front edge 118 of the shutter actuator 56, which prevents the tension spring 72 for the shutter actuator from having any affect on the metering/re-cocking member 104. This is important because the film sensing and metering pawls 106 and 108 of the metering/re-cocking member 104 are then in a pair of the film perforations 110 and 112. If the film sensing and metering pawls 106 and 108 were continuously subjected to the urging of the spring 72, in addition to that of the spring 120, when the pawls are in a pair of the film perforations 110 and 112, the filmstrip 20 would be tensioned too much.

When the one-time-use camera 10 is dropped or jarred, the mechanical shock may cause the shutter blade 46 to be slightly pivoted clockwise in FIG. 4 to separate from the blade stop end 54 of the light-intercepting rib 52. The closing spring 50 maintains the first closed end 128 of the slot 44 in the shutter blade against the pivot pin 40. Consequently, the shutter blade 46 is pivoted against the inclined blocking edge 124 (closing the slight space 126 which is shown in FIG. 4) to prevent the shutter blade from being pivoted open to uncover the front aperture 26. Then, the closing spring 50 returns the shutter blade 46 to against the blade stop end 54 of the light-intercepting rib 52 and separates the shutter blade from the inclined blocking edge 124 (re-effecting the slight space 126 as shown in FIG. 4).

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. film take-up chamber
16. film cartridge
18. film supply chamber
20. filmstrip
22. unexposed film roll
24. exposure opening
26. front aperture
28. film frames
30. film winding thumbwheel
32. film winding direction
34. film take-up direction
36. taking lens
38. lens plate
39. lens retainer
40. pivot pin
42. support piece
44. slot
46. shutter blade
48. limit stop
50. closing spring 52. light-intercepting rib
54. blade stop end
56. shutter actuator
58. rear guide pin
60. slot
62. front guide pin
64. island
66. cavity
68. actuating striker
70. slot
72. tension spring
74. tang
76. locking member
78. pivot pin
80. actuator lock
82. upstanding post
84. thumbwheel lock
86. peripheral teeth
88. return spring
90. anti backup pawl
92. top piece
94. shutter release button
96. depending projection
98. upstanding projection
100. frame counter
102. viewfinder
104. metering/re-cocking member
106. film sensing pawl
108. film metering pawl
110. film perforation
112. film perforation
114. re-cocking projection
116. slot
118. front edge
120. tension spring
122. blocking device
124. inclined blocking edge
126. blocking range/clearance space
128. first closed end
130. second closed end
132. one end
134. opposite end
136. one end
138. front side
140. opposite end
142. follower
144. cam
146. nub
148. rear side

What is claimed is:

1. A camera comprising a main body part with spaced film supply and film take-up chambers and an exposure opening located between said film supply and take-up chambers and configured for exposing an unexposed film frame, a metering pawl for engaging a film perforation during exposure of the film frame at said exposure opening, and a film winding take-up for moving an exposed frame in a film take-up direction from said exposure opening to said film take-up chamber, is characterized in that:

said metering pawl is supported to engage a film perforation between said exposure opening and said film supply chamber during exposure of a film frame at said exposure opening; and a tensioning spring urges said metering pawl substantially opposite to the film take-up direction in order to tension a film frame at said exposure opening, to prevent frame shift during exposure of the film frame.

2. A camera as recited in claim 1, wherein said film winding take-up includes a film winding thumbwheel rotatable in a film winding direction to move an exposed frame in the film take-up direction and into a film cartridge in said take-up chamber, and an anti-backup pawl engages said film winding thumbwheel to prevent reverse rotation of the film winding thumbwheel when said tensioning spring urges said metering pawl substantially opposite to the film take-up direction in order to tension a film frame at said exposure opening.

3. A camera as recited in claim 2, a thumbwheel lock engages said film winding thumbwheel to prevent rotation of the film winding thumbwheel in the film winding direction and is movable out of engagement with the film winding thumbwheel, and a shutter release button is manually depressible to initiate exposure of a film frame at said exposure opening and move said thumbwheel lock out of engagement with said film winding thumbwheel.

4. A camera as recited in claim 3, wherein said anti-backup pawl engages said film winding thumbwheel when said thumbwheel lock is moved out of engagement with said film winding thumbwheel.

5. A camera as recited in claim 1, wherein a film sensing pawl is fixed with respect to said metering pawl and is supported to engage a film perforation when said metering pawl engages a film perforation during exposure of a film frame at said exposure opening, and said tensioning spring urges said film sensing pawl substantially opposite to the film take-up direction in order to tension the film frame at said exposure opening.

* * * * *